United States Patent
Zhang et al.

(10) Patent No.: US 12,496,088 B2
(45) Date of Patent: Dec. 16, 2025

(54) ULTRASONIC SCALPEL, ENERGY INSTRUMENT FOR SURGERY, AND POWER ADJUSTMENT METHOD THEREFOR

(71) Applicant: ENSURGE MEDICAL (SUZHOU) CO., LTD., Jiangsu (CN)

(72) Inventors: Jun Zhang, Jiangsu (CN); Zhixin Wu, Jiangsu (CN)

(73) Assignee: Ensurge Medical (Suzhou) Co., Ltd., Jiangsu (CN)

( * ) Notice: Subject to any disclaimer, the term of this patent is extended or adjusted under 35 U.S.C. 154(b) by 77 days.

(21) Appl. No.: 18/702,319

(22) PCT Filed: Oct. 11, 2022

(86) PCT No.: PCT/CN2022/124534
§ 371 (c)(1),
(2) Date: Apr. 17, 2024

(87) PCT Pub. No.: WO2023/066077
PCT Pub. Date: Apr. 27, 2023

(65) Prior Publication Data
US 2024/0415531 A1    Dec. 19, 2024

(30) Foreign Application Priority Data
Oct. 18, 2021    (CN) .......................... 202111209462.0

(51) Int. Cl.
*A61B 17/32*    (2006.01)
*A61B 17/00*    (2006.01)
(Continued)

(52) U.S. Cl.
CPC ................ *A61B 17/320092* (2013.01); *A61B 2017/0003* (2013.01); *A61B 2017/00367* (2013.01);
(Continued)

(58) Field of Classification Search
CPC .... A61B 17/320092; A61B 2017/0003; A61B 2017/00367; A61B 2017/0042; A61B 2017/0046
See application file for complete search history.

(56) References Cited

U.S. PATENT DOCUMENTS

| | | |
|---|---|---|
| 5,026,387 A | 6/1991 | Thomas |
| 2010/0036405 A1 | 2/2010 | Giordano et al. |
| 2010/0125292 A1 | 5/2010 | Wiener et al. |

FOREIGN PATENT DOCUMENTS

| | | |
|---|---|---|
| CN | 2776452 | 5/2006 |
| CN | 1787852 | 6/2006 |

(Continued)

OTHER PUBLICATIONS

International Search Report and Written Opinion for International PCT Application No. PCT/CN2022/124534 dated Jan. 3, 2023 in 14 pages.

*Primary Examiner* — Ashley L Fishback
(74) *Attorney, Agent, or Firm* — Knobbe, Martens, Olson & Bear, LLP

(57) ABSTRACT

An ultrasonic scalpel, an energy instrument for surgery, and a power adjustment method therefor. The ultrasonic scalpel comprises a handheld component, a control module, an ultrasonic generator, and an ultrasonic cutter head, and further comprises the following modules: a load detection module, which is configured to detect the load conditions of the ultrasonic cutter head, the load detection module being electrically connected to an input end of the control module; a power conversion module, an input side thereof being electrically connected to an output end of the control module, and an output side thereof being electrically connected to the ultrasonic generator; the control module is configured to receive a detection signal from the load detection module, and when an activation button is pressed, the control module (Continued)

controls the power conversion module to adjust the output power of the ultrasonic generator.

17 Claims, 21 Drawing Sheets

(51) Int. Cl.
  *H02M 3/04* (2006.01)
  *H03F 3/24* (2006.01)
(52) U.S. Cl.
  CPC .............. *A61B 2017/0042* (2013.01); *A61B 2017/0046* (2013.01); *H02M 3/04* (2013.01); *H03F 3/245* (2013.01)

(56) References Cited

FOREIGN PATENT DOCUMENTS

| | | |
|---|---|---|
| CN | 203328803 | 12/2013 |
| CN | 203915795 | 11/2014 |
| CN | 209404883 | 9/2019 |
| CN | 110537958 A | 12/2019 |
| CN | 113456176 | 10/2021 |
| CN | 113712633 | 11/2021 |
| JP | 4649545 B2 | 12/2010 |

ULTRASONIC SCALPEL, ENERGY INSTRUMENT FOR SURGERY, AND POWER ADJUSTMENT METHOD THEREFOR

FIELD

The present disclosure relates to the technical field of medical devices, and in particular, to an ultrasonic scalpel, an energy instrument for surgery and a power adjustment method therefor.

BACKGROUND

Ultrasonic scalpels provide ultrasonic energy in various endoscopic surgery and conventional surgery, and are mainly used for hemostatic separation of soft tissues and tissue condensation. With the popularization of minimally invasive surgery, ultrasonic scalpels have become a conventional surgical instrument and are widely used. At present, the ultrasonic cutter head works under the action of an ultrasonic generator, and when the ultrasonic cutter head acts on the surgical site, the doctors press the activation button to cause the ultrasonic cutter head to continuously output power, while during the surgery, the ultrasonic cutter head often briefly leaves the surgical site, at this time, the doctor's operation continuity causes that the activation button is still pressed even when the cutter head leaves the surgical site.

The cost of ultrasonic scalpels is relatively high, therefore, the ultrasonic scalpels are not used as disposable instruments, however, the cutting tools of ultrasonic scalpels have a certain service life, which determines that ultrasonic scalpels cannot be used indefinitely. How to reduce the use cost of ultrasonic scalpels has become an urgent problem that needs to be solved at present.

SUMMARY

The purpose of the present disclosure is to provide an ultrasonic scalpel, an energy instrument for surgery and a power adjustment method therefor, which can automatically adjust the output power of the ultrasonic cutter head according to the current load condition to reduce unnecessary life loss.

To achieve the above purpose, a technical solution employed by the present disclosure is:

In one aspect, the present disclosure provides an ultrasonic scalpel comprising a handheld component, a control module, an ultrasonic generator and an ultrasonic cutter head, the handheld component being provided with an activation button, the ultrasonic scalpel further comprises the following modules:
  a load detection module, which is configured to detect a load condition of the ultrasonic cutter head, the load detection module being electrically connected to an input end of the control module;
  a power conversion module, an input side thereof being electrically connected to an output end of the control module, and an output side thereof being electrically connected to the ultrasonic generator;
  the control module is configured to receive a detection signal from the load detection module, and when the activation button is pressed, the control module controls the power conversion module to adjust an output power of the ultrasonic generator.

Further, according to any one of the above-mentioned technical solutions and combinations of multiple technical solutions, the ultrasonic generator comprises at least a first working state and a second working state, wherein magnitude of the output power of the ultrasonic generator in the first working state is less than that in the second working state; if the activation button is pressed and the ultrasonic cutter head is unloaded, the control module controls the power conversion module to adjust the ultrasonic generator to operate in the first working state; if the activation button is pressed and the ultrasonic cutter head is loaded, the control module controls the power conversion module to adjust the ultrasonic generator to operate in the second working state.

Preferably, the output power of the ultrasonic generator in the first working state ranges from 0.01-3 W; the output power of the ultrasonic generator in the second working state ranges from 3-40 W.

Further, according to any one of the above-mentioned technical solutions and combinations of multiple technical solutions, the activation button is electrically connected to the input end of the control module, and when the ultrasonic scalpel is connected to a power supply, the load detection module detects the load condition of the ultrasonic scalpel at a preset frequency or delay interval;
  if the activation button is pressed, and the load detection module detects that the ultrasonic cutter head transitions from a loaded state to an unloaded state, the control module controls the power conversion module to adjust the output power of the ultrasonic generator to decrease;
  if the activation button is pressed, and the load detection module detects that the ultrasonic cutter head transitions from an unloaded state to a loaded state, the control module controls the power conversion module to adjust the output power of the ultrasonic generator to increase;
  if the activation button is not pressed, the output power of the ultrasonic generator is zero.

Further, according to any one of the above-mentioned technical solutions and combinations of multiple technical solutions, the load detection module comprises a resonance signal acquisition unit, an impedance calculation unit, and a determination unit, wherein,
  the resonance signal acquisition unit is configured to sample the voltage and current of a circuit of the ultrasonic scalpel in a resonant state;
  the impedance calculation unit is configured to calculate a resonant impedance based on the voltage and current signals sampled by the resonance signal acquisition unit;
  the determination unit is configured to determine the load condition of the ultrasonic scalpel based on calculation result of the impedance calculation unit, including: comparing the calculation result with a preset impedance threshold, if a calculated resonant impedance is greater than or equal to the preset impedance threshold, it is determined that the load condition of the ultrasonic scalpel is loaded; if a calculated resonant impedance is less than the preset impedance threshold, it is determined that the load condition of the ultrasonic scalpel is unloaded.

Further, according to any one of the above-mentioned technical solutions and combinations of multiple technical solutions, the load detection module comprises a resonance signal acquisition unit, and a determination unit, wherein,
  the resonance signal acquisition unit is configured to sample the resonant frequency of a circuit of the ultrasonic scalpel in the resonant state;

the determination unit is configured to determine the load condition of the ultrasonic scalpel based on two consecutive signal acquisition results of the resonance signal acquisition unit, including: comparing the difference between the two consecutive signal acquisition results with a preset frequency change threshold, if the two consecutive sampled resonant frequencies show an upward trend and the absolute value of the difference is greater than or equal to the preset frequency change threshold, it is determined that the load condition of the ultrasonic scalpel transitions from loaded to unloaded; if the two consecutive sampled resonant frequencies show a downward trend and the absolute value of the difference is greater than or equal to the preset frequency change threshold, it is determined that the load condition of the ultrasonic scalpel transitions from unloaded to loaded.

Further, according to any one of the above-mentioned technical solutions and combinations of multiple technical solutions, the power conversion module is a DC/DC conversion unit electrically connected to an ultrasonic power amplifier module, the DC/DC conversion unit outputs different magnitudes of voltage under the control of the control module;

if the voltage output by the DC/DC conversion unit is lower than a preset first voltage threshold, the ultrasonic power amplifier module drives the ultrasonic generator to output power in the first working state;

if the voltage output by the DC/DC conversion unit is higher than a preset second voltage threshold, the ultrasonic power amplifier module drives the ultrasonic generator to output power in the second working state, wherein, the second voltage threshold is greater than or equal to the first voltage threshold.

Further, according to any one of the above-mentioned technical solutions and combinations of multiple technical solutions, the handheld component comprises a handle shell, a transducer assembly and a power cord, wherein the control module and the transducer assembly are arranged within an receiving cavity of the handle shell, and the transducer assembly is rotatably arranged around an axis in the receiving cavity;

one end portion of the power cord is connected to the transducer assembly in the receiving cavity, and the other end portion of the power cord goes through a lower portion of the handle shell to the outside of the receiving cavity.

Further, according to any one of the above-mentioned technical solutions and combinations of multiple technical solutions, the transducer assembly comprises a transducer housing, the transducer housing and the ultrasonic generator are fixedly arranged to each other, the transducer housing has a hollow cavity, at least a rear portion of the ultrasonic generator is housed within the hollow cavity, and the transducer assembly further comprises a conductive element fixedly arranged on the outer side of the transducer housing;

the conductive element has at least a conductive portion, the ultrasonic generator is fixedly and electrically connected to the conductive portion, the receiving cavity of the handle shell is further fixedly provided with an electrically connected element therein, the electrically connected element abuts against the conductive portion, and in the process that the transducer assembly is rotated about its own axis with respect to the handle shell, the electrically connected element is always in contact with the conductive portion to maintain electric connection.

Further, according to any one of the above-mentioned technical solutions and combinations of multiple technical solutions, the ultrasonic power amplifier module is connected to the ultrasonic generator through the conductive element;

the ultrasonic scalpel further comprises a cutting tool, the cutter bar of the cutting tool is detachably and fixedly connected to the ultrasonic generator, the transducer is configured to convert the energy transferred by the ultrasonic generator and transfer the converted energy to the cutting tool.

In another aspect, the present disclosure provides an energy instrument for surgery comprising:

an energy generating apparatus configured to generate energy;

a handheld component, which is provided with an activation button;

a load detection module, which is configured to detect a load condition of the energy instrument for surgery, the load condition being an unloaded condition or a loaded condition;

a control module, an input end thereof being electrically connected to the activation button and the load detection module; the control module being configured to receive a detection signal from the load detection module, and when the activation button is pressed, the control module outputting a control signal;

a power conversion module, which is electrically connected to an output end of the control module, and is configured to adjust the working state of the energy generating apparatus under the triggering of the control signal of the control module;

the energy generating apparatus comprises at least a first working state and a second working state, wherein the magnitude of the output power of the energy generating apparatus in the first working state is less than that in the second working state; if the activation button is pressed and the load detection module detects that it is unloaded currently, the control module controls the power conversion module to adjust the energy generating apparatus to operate in the first working state; if the activation button is pressed and the load detection module detects that it is loaded currently, the control module controls the power conversion module to adjust the energy generating apparatus to operate in the second working state; if the activation button is not pressed, the output power of the energy generating apparatus is zero.

Further, according to any one of the above-mentioned technical solutions and combinations of multiple technical solutions, the power conversion module is a DC/DC conversion unit electrically connected to a power amplifier module, and the DC/DC conversion unit outputs different magnitudes of voltage under the control of the control module;

if the voltage output by the DC/DC conversion unit is lower than a preset first voltage threshold, the power amplifier module drives the energy generating apparatus to output power in the first working state;

if the voltage output by the DC/DC conversion unit is higher than a preset second voltage threshold, the power amplifier module drives the energy generating apparatus to output power in the second working state, wherein, the second voltage threshold is greater than or equal to the first voltage threshold.

Further, according to any one of the above-mentioned technical solutions and combinations of multiple technical solutions, the load detection module comprises a resonance signal acquisition unit, an impedance calculation unit, and a determination unit, wherein,
- the resonance signal acquisition unit is configured to sample the voltage and current of a circuit of the energy instrument for surgery in the resonant state;
- the impedance calculation unit is configured to calculate a resonant impedance based on the voltage and current signals sampled by the resonance signal acquisition unit;
- the determination unit is configured to determine the load condition of the energy instrument for surgery based on the calculation result of the impedance calculation unit, including: comparing calculation result with a preset impedance threshold, if a calculated resonant impedance is greater than or equal to the preset impedance threshold, it is determined that the load condition of the energy instrument for surgery is loaded; if a calculated resonant impedance is less than the preset impedance threshold, it is determined that the load condition of the energy instrument for surgery is unloaded.

Further, according to any one of the above-mentioned technical solutions and combinations of multiple technical solutions, when the circuit of the energy instrument for surgery is switched on, the load detection module detects the load condition of the energy instrument for surgery at a preset frequency or delay interval;

Optionally, the energy instrument for surgery is an ultrasonic scalpel, the energy generating apparatus is an ultrasonic generator, and the ultrasonic generator is arranged inside or outside the handheld component; or,
- the energy instrument for surgery is a laser knife, the energy generating apparatus is a laser generator, and the laser generator is arranged inside or outside the handheld component; or,
- the energy instrument for surgery is an electric knife, the energy generating apparatus is an electrical signal generator, and the electrical signal generator is arranged inside or outside the handheld component.

Further, according to any one of the above-mentioned technical solutions and combinations of multiple technical solutions, the energy instrument for surgery further comprises a cutting tool arranged at the front side of the handheld component, the load detection module comprises a biosensor arranged on one end of the cutting tool away from the handheld component, and if the biosensor detects contact with an object or proximity to an object within a preset distance threshold, it outputs a detection result of the energy instrument for surgery being loaded, if not, it outputs a detection result of the energy instrument for surgery being unloaded.

In yet another aspect, the present disclosure provides a power adjustment method for an energy instrument for surgery, the adjusted energy instrument for surgery comprises an activation button and an energy generating apparatus, the control mode of the activation button for energy output is configured as follows: if the activation button is pressed, the energy generating apparatus outputs energy, if the activation button is released, the energy generating apparatus stops outputting energy, and when the activation button is pressed, the output power of the energy generating apparatus is adjusted according to the load condition of the instrument, the power adjustment method comprises:
- if the activation button is pressed, and the load condition of the instrument is unloaded, adjusting the output power of the energy generating apparatus to an output power corresponding to a first working state; if the activation button is pressed, and the load condition of the instrument is loaded, adjusting the output power of the energy generating apparatus to an output power corresponding to a second working state, wherein the magnitude of the output power of the energy generating apparatus in the first working state is less than that in the second working state.

Optionally, the power adjustment method is applied to the following energy instruments for surgery:
- the energy instrument for surgery is an ultrasonic scalpel, the energy generating apparatus is an ultrasonic generator, and the ultrasonic generator is arranged inside or outside the handheld component; or,
- the energy instrument for surgery is a laser knife, the energy generating apparatus is a laser generator, and the laser generator is arranged inside or outside the handheld component; or,
- the energy instrument for surgery is an electric knife, the energy generating apparatus is an electrical signal generator, and the electrical signal generator is arranged inside or outside the handheld component.

The present disclosure further provides an ultrasonic scalpel comprising an ultrasonic scalpel handle having its own ultrasonic generator function, the ultrasonic scalpel handle comprising:
- a handle shell, a shift button, a handgrip;
- the head of the handle shell is provided with a handle connection mechanism, which is used for connecting with a cutting tool;
- the handle shell is provided with a cavity, within which a transformer, a transducer, a first PCB board, and a second PCB board are arranged;
- the first PCB board is arranged at the top of the cavity;
- the transformer is arranged at the tail end of the cavity;
- the second PCB board is arranged at the handheld component of the cavity;
- the first PCB board and the second PCB board can both be provided as control boards or power boards;
- the shift button is arranged at the front of the handle shell, which is used to switch between high and low power levels;
- the handgrip is located at the front of the handle shell, which is used to control the opening and closing of the clamp of the cutting tool.

The beneficial effects brought by the technical solutions provided by the present disclosure are as follows:
a. When the energy instrument for surgery is in the unloaded state, the low-power output mode is automatically operated to reduce the unnecessary vibration amplitude of the cutting tool of the ultrasonic scalpel in the unloaded state, extend the service life of the cutting tool, and reduce the single use cost of the ultrasonic scalpel;
b. The output power of the ultrasonic generator is automatically adjusted according to its own load conditions, with the standard power normally output under loaded conditions, without affecting the surgical effects.

BRIEF DESCRIPTION OF THE DRAWINGS

For more clearly explaining the technical solutions in the embodiments of the present application or in the prior art, the accompanying drawings required to be used to in the description of the embodiments or the prior art will be simply introduced below. Apparently, the drawings in the following description show merely some embodiments described in the present application, and those of ordinary skill in the art may derive other drawings from these accompanying drawings without creative efforts.

Figure 1:
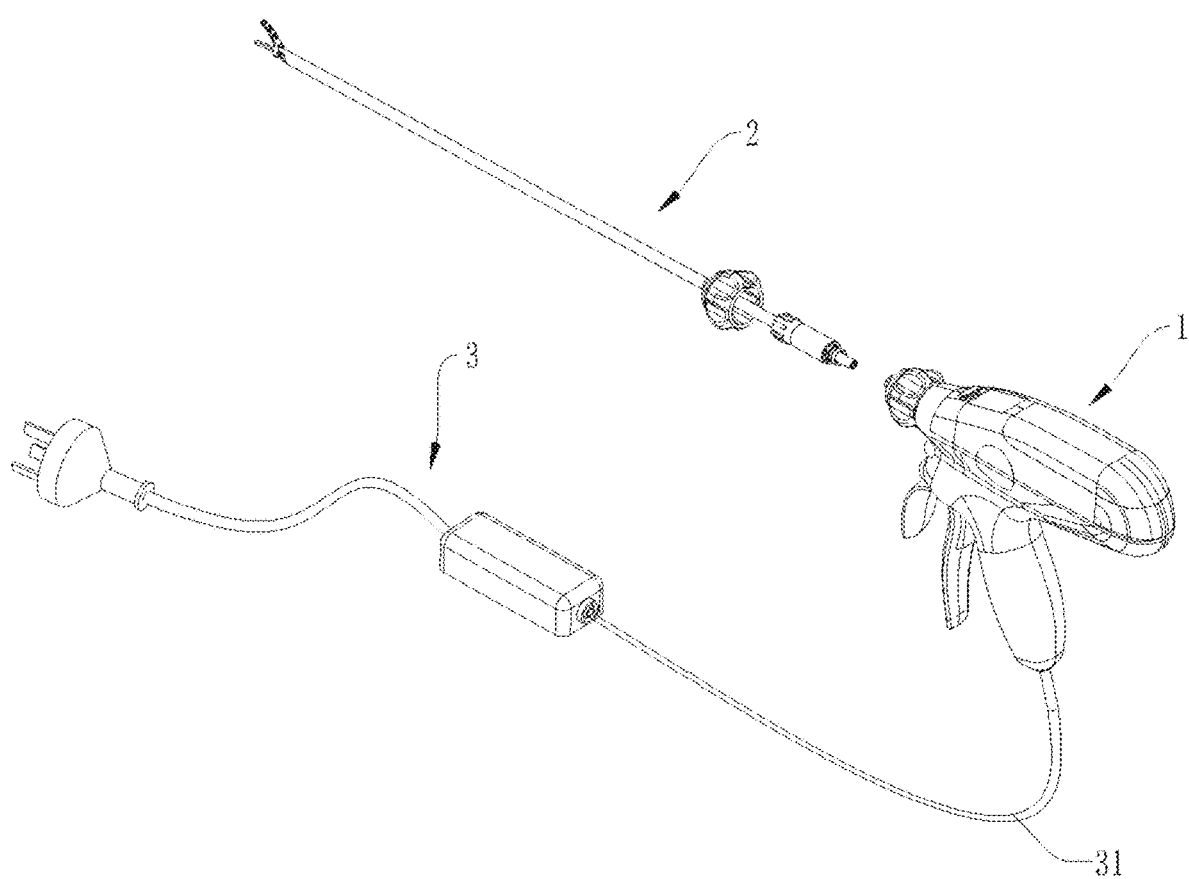
FIG. 1 is a schematic structure diagram of an ultrasonic scalpel provided in an exemplary embodiment of the present disclose.
Figure 2:
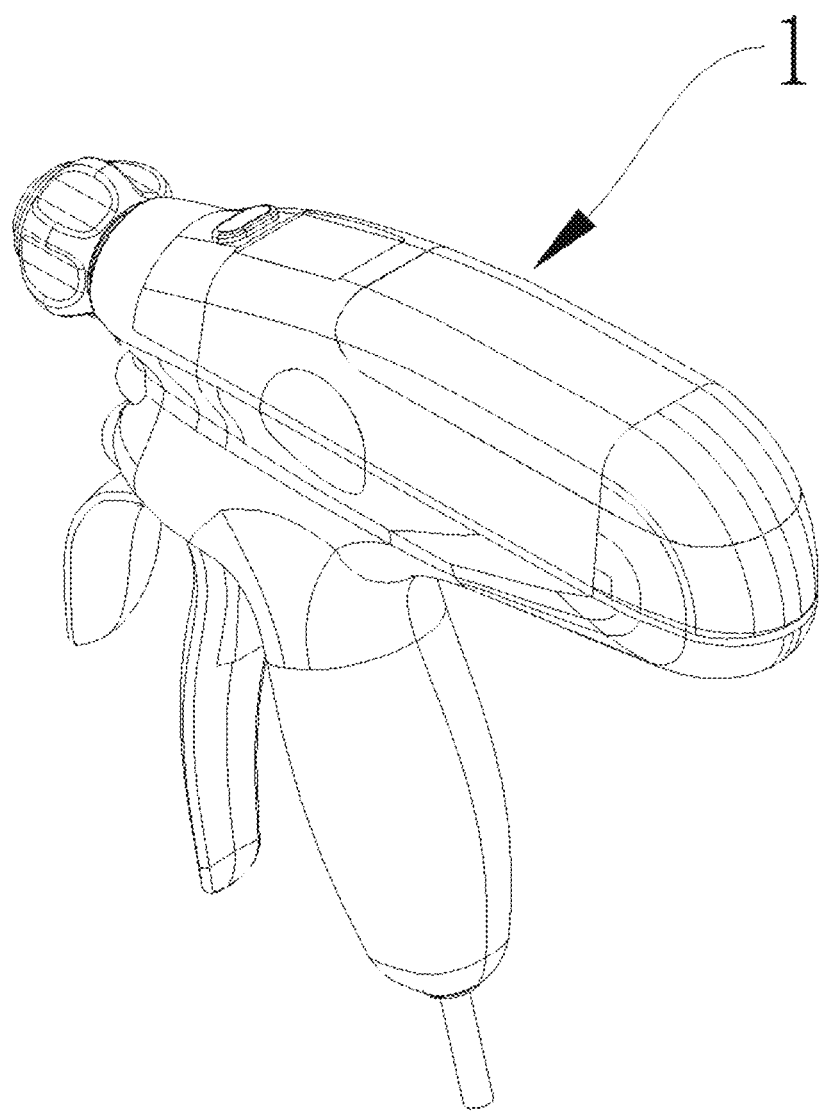
FIG. 2 is a schematic overall structure diagram of an ultrasonic scalpel handle provided in an exemplary embodiment of the present disclose.

wherein, reference signs comprise:

1, ultrasonic scalpel handle; 11, handle shell; 11a, left shell; 11b, right shell; 11c, top cover; 11d, perspective window;

12, transducer assembly; 121, transducer housing; 1211, front housing; 1212, rear housing; 1213, middle housing; 121a, straight gear ring;

122, ultrasonic generator; 1221, shaft rod having size variation; 1222, rod core having size variation; 1223, baffle ring; 1224, first electrically connected wire/second electrically connected wire;

123, conductive element; 1231, first conductive ring (first conductive portion); 1232, second conductive ring (second conductive portion); 1233, spacer ring; 1234, insulation sleeve; 1235, positioning lug boss; 123O, plate body; 123a, first conductive piece; 123b, second conductive piece; 123c, first perforated hole; 123d, second perforated hole;

124, connecting screw; 125, rubber gasket; 126, rubber ring; 127, front baffle cover; 128, rear sealing ring; 129, screw;

13, electrically connected element; 131, first electrically connected element; 132, second electrically connected element; 13a, first elastic electrically connected piece; 13b, second elastic electrically connected piece.

DETAILED DESCRIPTION

In order to make those skilled in the art better understand the solutions of the present disclosure, the technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments obtained by those of ordinary skill in the art without creative efforts based on the embodiments of the present disclosure shall fall within the protective scope of the present disclosure.

It should be noted that terms such as "first" and "second" in the description, the claims and the accompanying drawings of the present disclosure are used to/intended to distinguish similar objects, and do not have to be used to/are not intended to describe a specific order or sequence. It should be understood that data used in this manner may be interchangeable where appropriate, so that the embodiments of the present disclosure described herein can be implemented in an order other than/in addition to those illustrated or described herein. In addition, terms "comprise" and "have" and any other variants thereof are intended to cover non-exclusive inclusion, for example, a process, method, device, product, or equipment that includes a series of steps or units is not necessarily limited to those clearly listed steps or units, but may include other steps or units not listed clearly or inherent to the process, method, product, or equipment.

During the surgical operation of ultrasonic scalpels, it requires a certain output power of the ultrasonic generator to achieve its hemostatic separation and tissue coagulation of soft tissues, therefore, current ultrasonic scalpels are configured to have one or more rated output powers, most ultrasonic scalpels are provided with high-power keys and low-power keys on their handles, pressing the high-power keys will cause the ultrasonic scalpels to work in the high-power mode, and in this mode, the output power range of the ultrasonic generators in the unloaded state is 6-9 W, which is usually suitable for cutting and separating soft tissues; pressing the low-power keys will cause the ultrasonic scalpels to work in the low-power mode, and in this mode, the output power range of the ultrasonic generators in the unloaded state is 3-7.6 W, which is usually suitable for coagulation of soft tissues. When the output power is lower than that in the low-power mode, it cannot have a surgical effect on the tissues, therefore, in prior art, it is not easy to think of adjusting the output power of the ultrasonic generator of the ultrasonic scalpel to be lower than that in the low-power mode (below 3 W).

Figure 21:
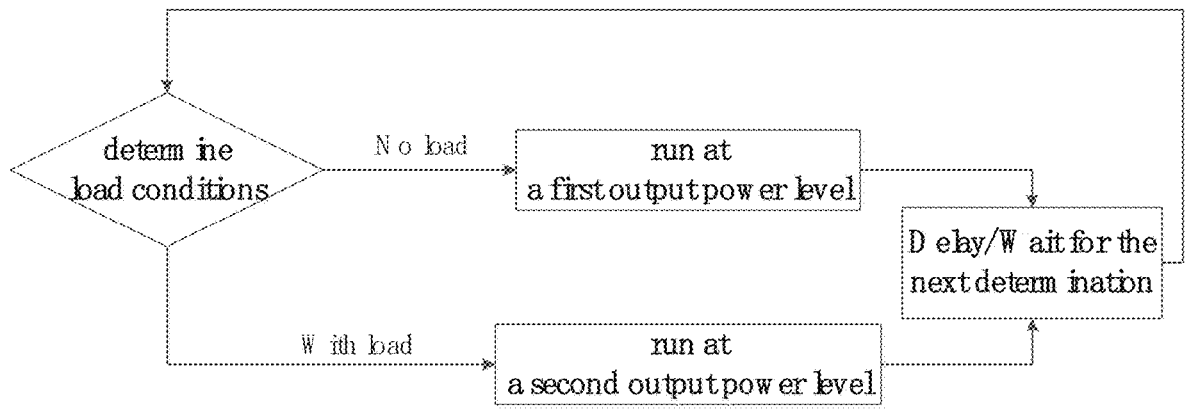
FIG. 21 is a schematic diagram of the output power adjustment logic of an energy instrument for surgery provided in an exemplary embodiment of the present disclose.

In one embodiment of the present disclosure, an ultrasonic scalpel is provided, which comprises a handheld component, an ultrasonic generator, an ultrasonic cutter head and a control module, the handheld component is provided with an activation button electrically connected to an input end of the control module, and the ultrasonic scalpel further comprises the following modules:

a load detection module, which is configured to detect a load condition of the ultrasonic cutter head, the load detection module being electrically connected to the input end of the control module; and a power conversion module, an input side thereof being electrically connected to an output end of the control module, an output side thereof being electrically connected to the ultrasonic generator, the power conversion module being configured to adjust the ultrasonic generator under the control signal of the control module to output different ultrasonic powers;

the working states of the ultrasonic generator comprises at least a first working state and a second working state, wherein the first working state corresponds to the situation that the ultrasonic cutter head is unloaded; the second working state corresponds to the situation that the ultrasonic cutter head is loaded, the magnitude of the output power of the ultrasonic generator in the first working state is less than that in the second working state; as shown in FIG. 21, specifically, when the ultrasonic scalpel is connected to a power supply, if the activation button is pressed, and the load detection module detects that the ultrasonic scalpel is unloaded, the control module controls the power conversion module to adjust the working state of the ultrasonic generator to the first working state; if the activation button is pressed, and the load detection module detects that the ultrasonic scalpel is loaded, the control module controls the power conversion module to adjust the working state of the ultrasonic generator to the second working state; if the activation button is not pressed, the output power of the ultrasonic generator is zero.

Due to the higher output power of the ultrasonic generator, the greater the vibration amplitude of the cutting tool of the ultrasonic scalpel, it results in a shortened service life of the cutting tool, and for ultrasonic scalpels with an integrated structure of the cutting tool and handle, the service life of the cutting tools is the service life of the ultrasonic scalpels. In the actual use of ultrasonic scalpels, surgeons are usually used to press the activation button first before gripping tissues, or delay the release of the activation button after tissue cutting, and due to that it is difficult to ensure that the activation button is pressed while in contact with a tissue or released while leaving the tissue, for a portion of the time during use, the ultrasonic scalpels are unloaded but still output power according to the loaded standard, and research has found that under the same output power, the vibration amplitude of cutting tools of ultrasonic scalpels in the unloaded state is greater than that in the loaded state. If the technical solution of this embodiment is adopted, the time it takes to adjust to the first working state with a lower power after detecting the unloaded state can be basically considered as the service life of the ultrasonic scalpel extended by the technical solution of this embodiment, assuming that the actual operation time of the ultrasonic scalpel on a tissue is 10 s, the time from pressing the activation button in advance to finding the tissue for operation is 2 s, and the time from completing the operation to releasing the activation button is 1 s, it is equivalent to the technical solution of this embodiment extending the service life of the ultrasonic scalpel by about 30%.

The present invention does not limit the number of activation buttons, there may be one or more activation buttons, for example, in this embodiment, it comprises two activation buttons, namely a high-power activation button and a low-power activation button, as mentioned above, the high-power activation button corresponds to the high power set for cutting (such as 6-9 W), and the low-power activation button corresponds to the low power set for condensing (such as 3-7.6 W); obviously, regardless of whether the high-power activation button or the low-power activation button is pressed, when the ultrasonic scalpel is detected to be unloaded, the ultrasonic generator is adjusted to output in the first working state, and the corresponding output power of the ultrasonic generator can be 0.01 W, or any value within the range of greater than 0.01 W but not more than 3 W, that is, the power output in the unloaded state is less than the set value of the low-power for coagulation. In this embodiment, the output power of the ultrasonic generator corresponding to the second working state can be set to any value within the range of not less than 3 W and not more than 45 W, for example, the output power of the ultrasonic generator under the unloaded conditions is 0.01 W, and the output power of the ultrasonic generator jumps to 3 W when load is detected, or, the output power of the ultrasonic generator under the unload condition is 0.1 W, and the output power of the ultrasonic generator jumps to 4.5 W when load is detected, or, the output power of the ultrasonic generator under the unload condition is 0.2 W, and the output power of the ultrasonic generator jumps to 3.6 W when load is detected, specifically, the high-power activation button and/or the low-power activation button can adjust the power according to multiple levels, for example, the low-power activation button can select 1st-4th levels, with a power of approximately 5-7.6 W in the 4th level, approximately 4.3-6.5 W in the 3rd level, approximately 3.6-5.4 W in the 2nd level, and approximately 3-4.5 W in the 1st level; the settings of the above multiple levels are defined as the starting point of the output power of the ultrasonic generator that jumps when a load is detected on the ultrasonic cutter head. As the load on the ultrasonic cutter head of the ultrasonic scalpel increases, the actual output power of the ultrasonic generator increases, and the maximum power that the ultrasonic generator of the ultrasonic scalpel can actually output is set to 45 W.

In this embodiment, the ultrasonic scalpel is subjected to no-load protection, that is, when it is judged that it is unloaded currently, the output power can be reduced to a sufficiently low level, however, due to the differences between different cutter heads, the impedance of each cutter head may vary slightly, in order to ensure the reliability of the system and the stability in the critical state, as well as to ensure that the power is not lost after loading, the setting range of the output power of the first working state in this embodiment is 0.01 to 3 W, and further optionally 0.1 to 3 W or 0.5 to 3 W. In different embodiments, the first working state with different power values and the second working state with different power ranges can be set.

To facilitate the description of the relative positions of the components in the ultrasonic scalpel, the above and following descriptions of the front-rear direction are defined with reference to the direction observed by an operator while holding the ultrasonic scalpel for operation, where the position of the ultrasonic scalpel acting on the surgical site is front, and the position of the ultrasonic scalpel near the body of an operator (doctor) is rear.

Referring to the ultrasonic scalpel system shown in FIG. 1, it comprises an ultrasonic scalpel, and a power adapter 3 for supplying energy to the ultrasonic scalpel; wherein the ultrasonic scalpel comprises an ultrasonic scalpel handle 1, and a cutting tool 2 detachably mounted on the ultrasonic scalpel handle 1.

Figure 4:
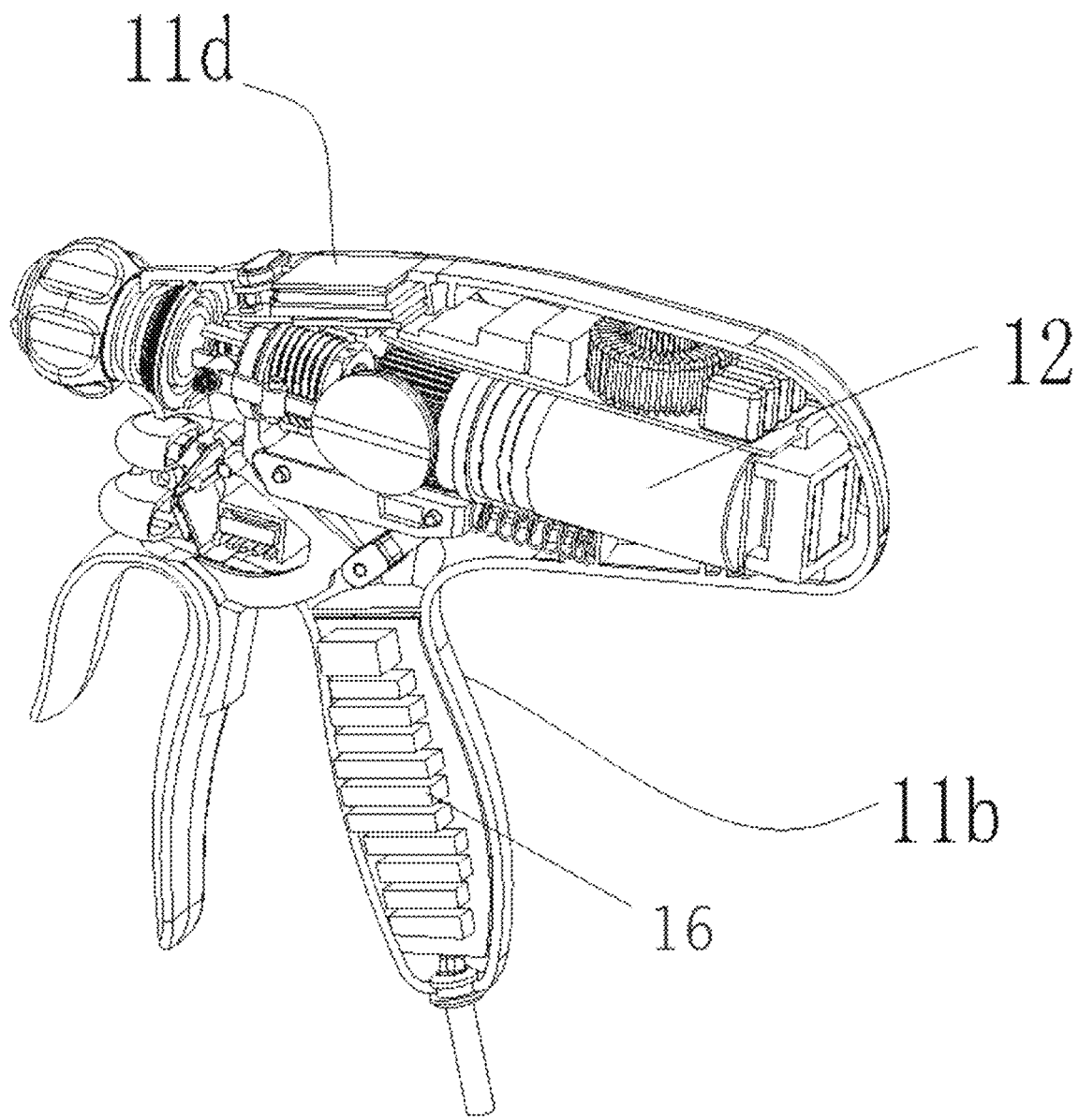
FIG. 4 is a schematic internal structure diagram of an ultrasonic scalpel handle provided in an exemplary embodiment of the present disclose.
Figure 19:
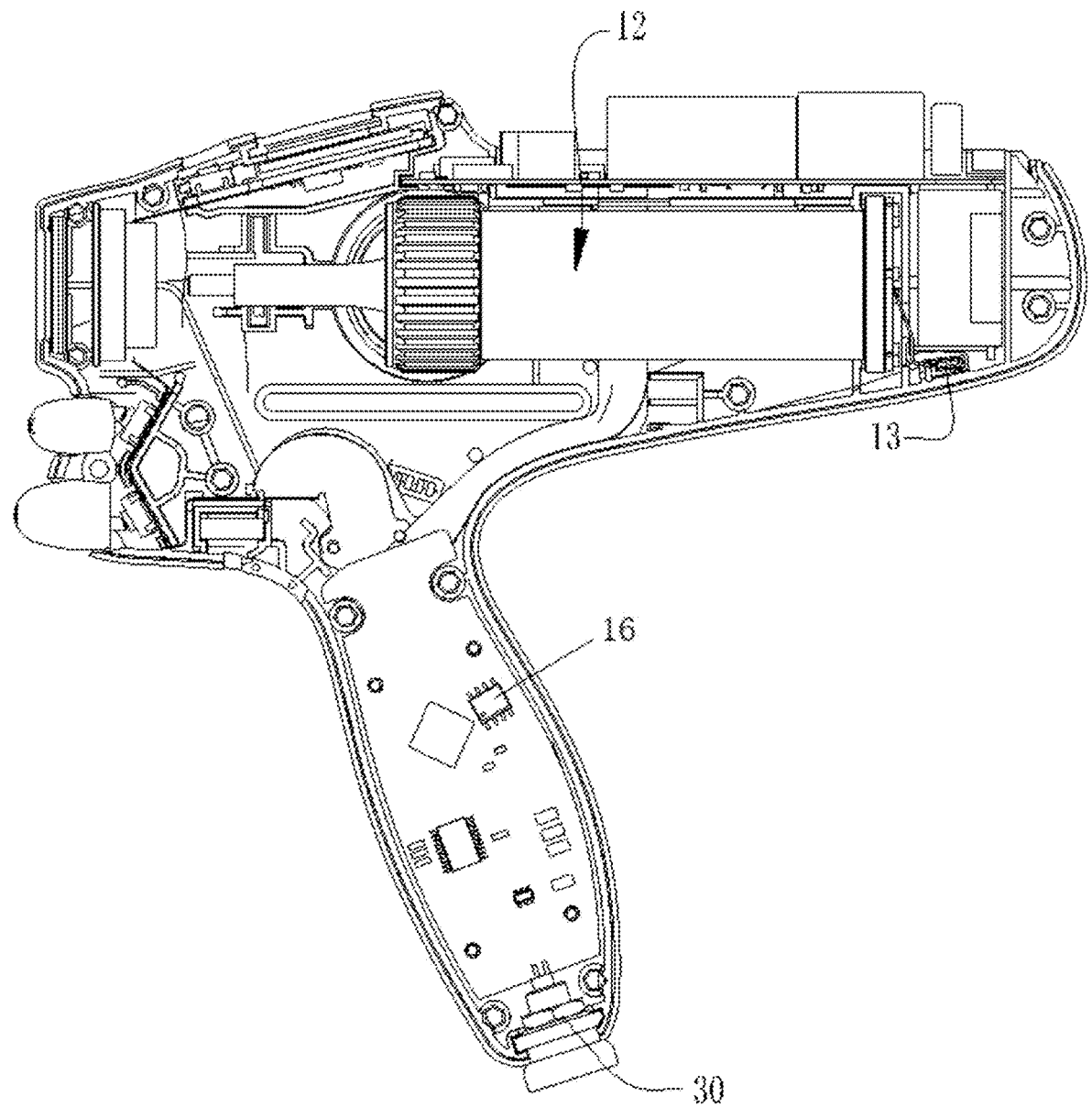
FIG. 19 is a schematic internal structure diagram of an ultrasonic scalpel handle provided in an exemplary embodiment of the present disclose.

Referring to the accompanying drawings, the ultrasonic scalpel handle 1 comprises a handle shell 11 and a transducer assembly 12, the handle shell 11 comprises a left shell 11a and a right shell 11b that are fixedly connected and fitted, and a top cover 11c located at the top, which has an receiving cavity, the transducer assembly 12 is integrally housed in the receiving cavity and can be rotatably arranged about its own axis, and the control module 16 is optionally arranged in the receiving cavity, as shown in FIG. 4 and FIG. 19. The transducer assembly 12 comprises a transducer housing 121 and an ultrasonic generator 122 that are fixedly to each other, the transducer housing 121 has a hollow cavity, and at least the rear portion of the ultrasonic generator 122 is housed in the above-mentioned hollow cavity and is fixed with respect to the transducer housing 121.

Specifically, referring to the accompanying drawings, the ultrasonic generator 122 is an integral element, and comprises a shaft rod having size variation 1221 and a rod core having size variation 1222 successively arranged along an axial direction, a baffle ring 1223 is formed at the position where the shaft rod having size variation 1221 is connected to the rod core having size variation 1222, the rod core having size variation 1222 and the baffle ring 1223 are all housed in the hollow cavity of the transducer housing 121, and the front portion of the shaft rod having size variation 1221 extends out of the hollow cavity and is connected to the cutting tool 2 through the front connecting screw 124.

The transducer assembly 12 further comprises a conductive element 123 fixedly arranged on the outer side of the transducer housing 121, the conductive element 123 has at least a conductive portion, the ultrasonic generator 122 is fixedly and electrically connected to the conductive portion mentioned above, the receiving cavity of the handle shell 11 is further fixedly provided with an electrically connected element 13 therein, the electrically connected element 13 abuts against the conductive portion, and in the process that the ultrasonic generator 122 rotates about its own axis with respect to the handle shell 11, the electrically connected element 13 is always in contact with the conductive portion to maintain electric connection.

In a structure embodiment of an ultrasonic scalpel of the present disclosure, as shown in FIG. 2 to FIG. 10, the conductive element 123 is fixedly arranged at an outer peripheral portion of the transducer housing 121, the conductive portion is in a shape of a circular ring, and the axis of the conductive portion extends collinear with the axis of the transducer assembly 12. Specifically, the conductive portion comprises a first conductive portion and a second conductive portion that are insulated from each other and are both in a shape of a circular ring, the ultrasonic generator 122 has two electrically connected wires 1224—a first electrically connected wire and a second electrically connected wire, and the two electrically connected wires are electrically connected to the two conductive portions, respectively.

The two conductive portions are spaced along the axial direction of the transducer housing 121, in this embodiment, the conductive element 123 comprises two conductive rings both made of a conductive material—a first conductive ring 1231 and a second conductive ring 1232, and a spacer ring 1233 arranged between the first conductive ring 1231 and the second conductive ring 1232 and made of an insulation material, the first conductive ring 1231 forms the first conductive portion and the second conductive ring 1232 forms the second conductive portion. An end portion of the first electrically connected wire 1224 is fixedly arranged on the first conductive ring 1231 to realize electric connection, and an end portion of the second electrically connected wire 1224 is fixedly arranged on the second conductive ring 1232 to realize electric connection.

The first conductive ring 1231, the second conductive ring 1232 and the spacer ring 1233 are fixedly sleeved on the outer peripheral portion of the transducer housing 121, specifically, a circumferential limit structure is provided between each conductive ring and the spacer ring 1233 to limit their relative rotation, and a positioning structure is further provided between the entire conductive element 123 and the transducer housing 121 to limit the rotation of the conductive element 123 and the axial movement of the conductive element 123.

Figure 6:
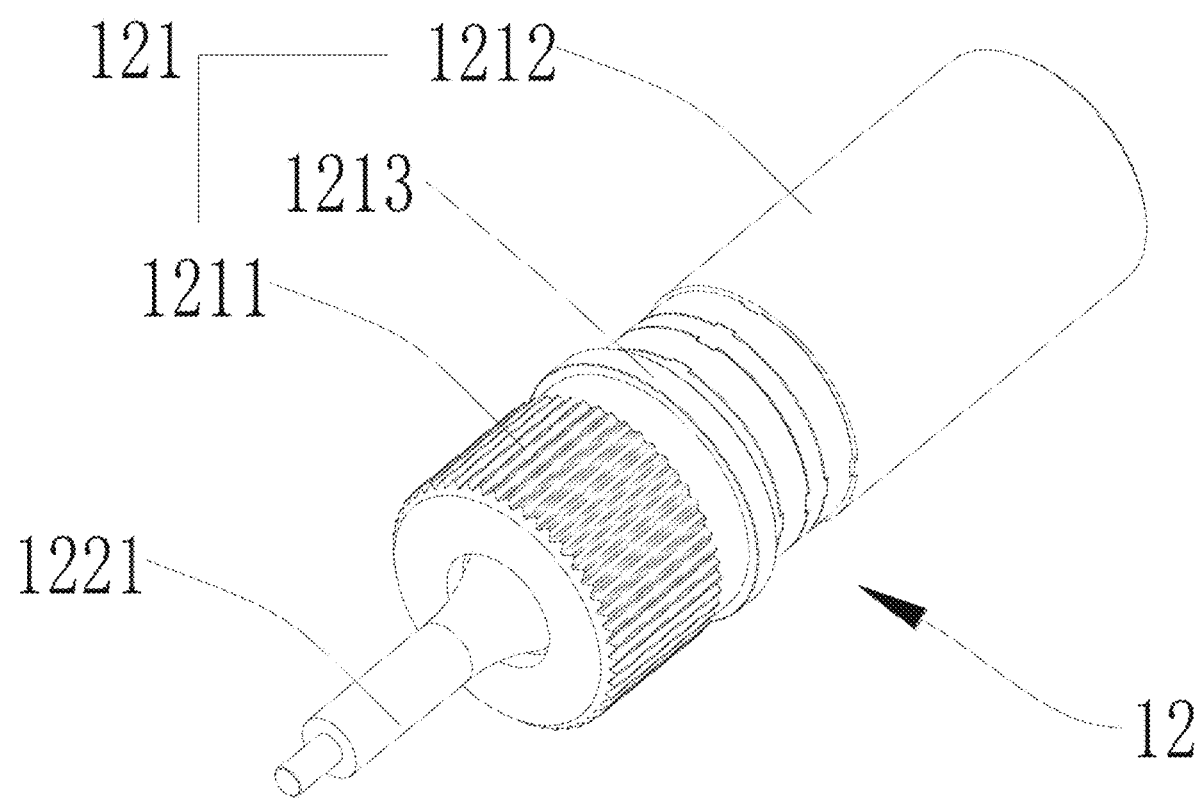
FIG. 6 is a schematic overall structure diagram of a transducer assembly provided in an exemplary embodiment of the present disclose.
Figure 7:
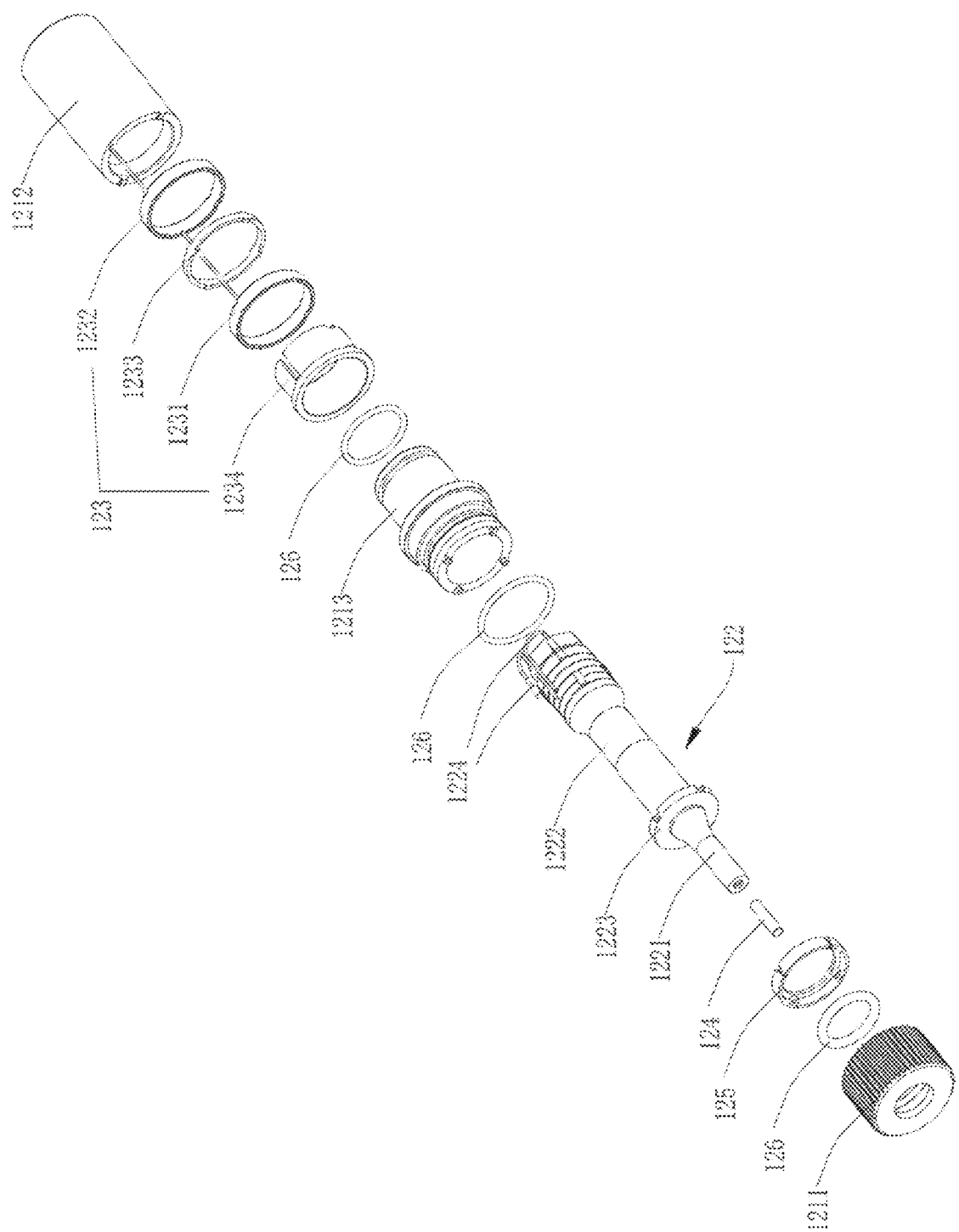
FIG. 7 is a schematic exploded structure diagram of the transducer assembly of FIG. 6.
Figure 8:
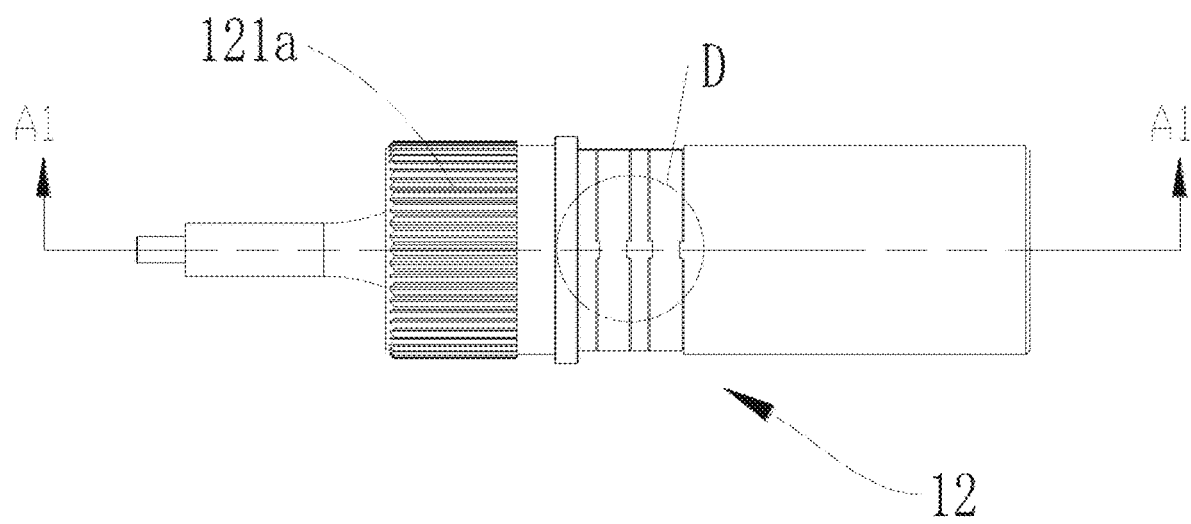
FIG. 8 is a front view of the transducer assembly of FIG. 6.
Figure 9:
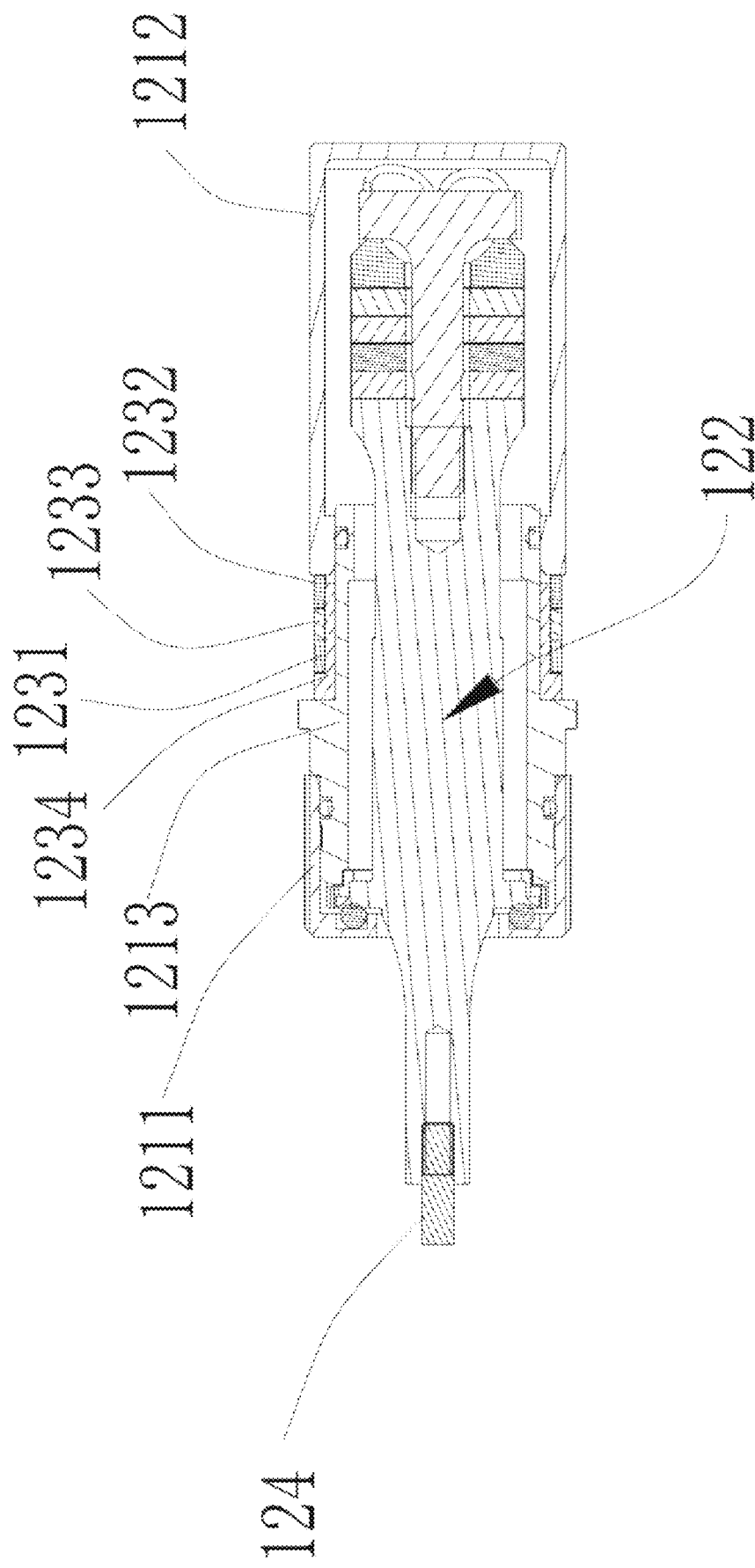
FIG. 9 is a schematic sectional view along Direction A1-A1 in FIG. 8.
Figure 10:
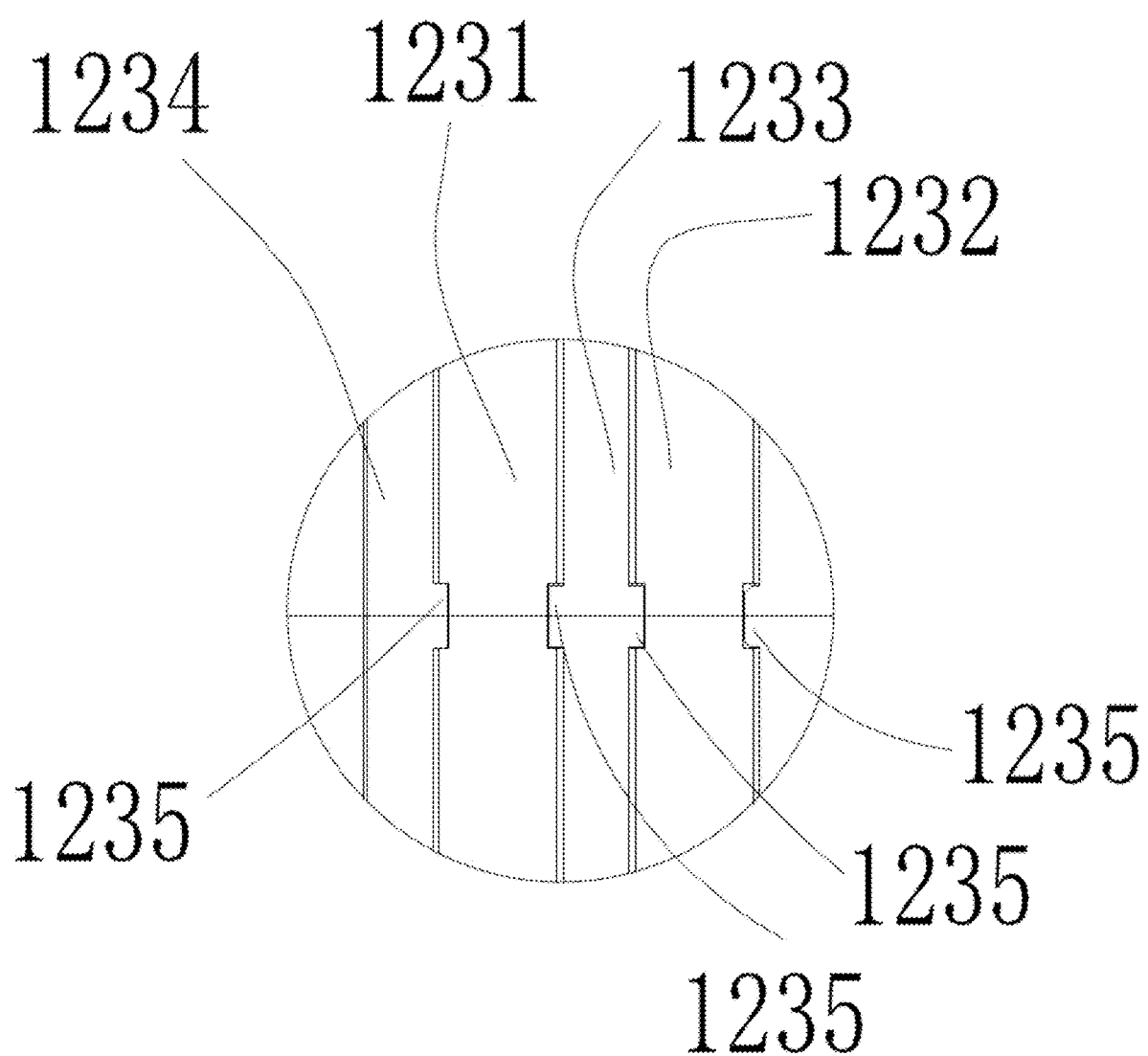
FIG. 10 is a schematic enlarged diagram at Part D in FIG. 8.
Figure 11:
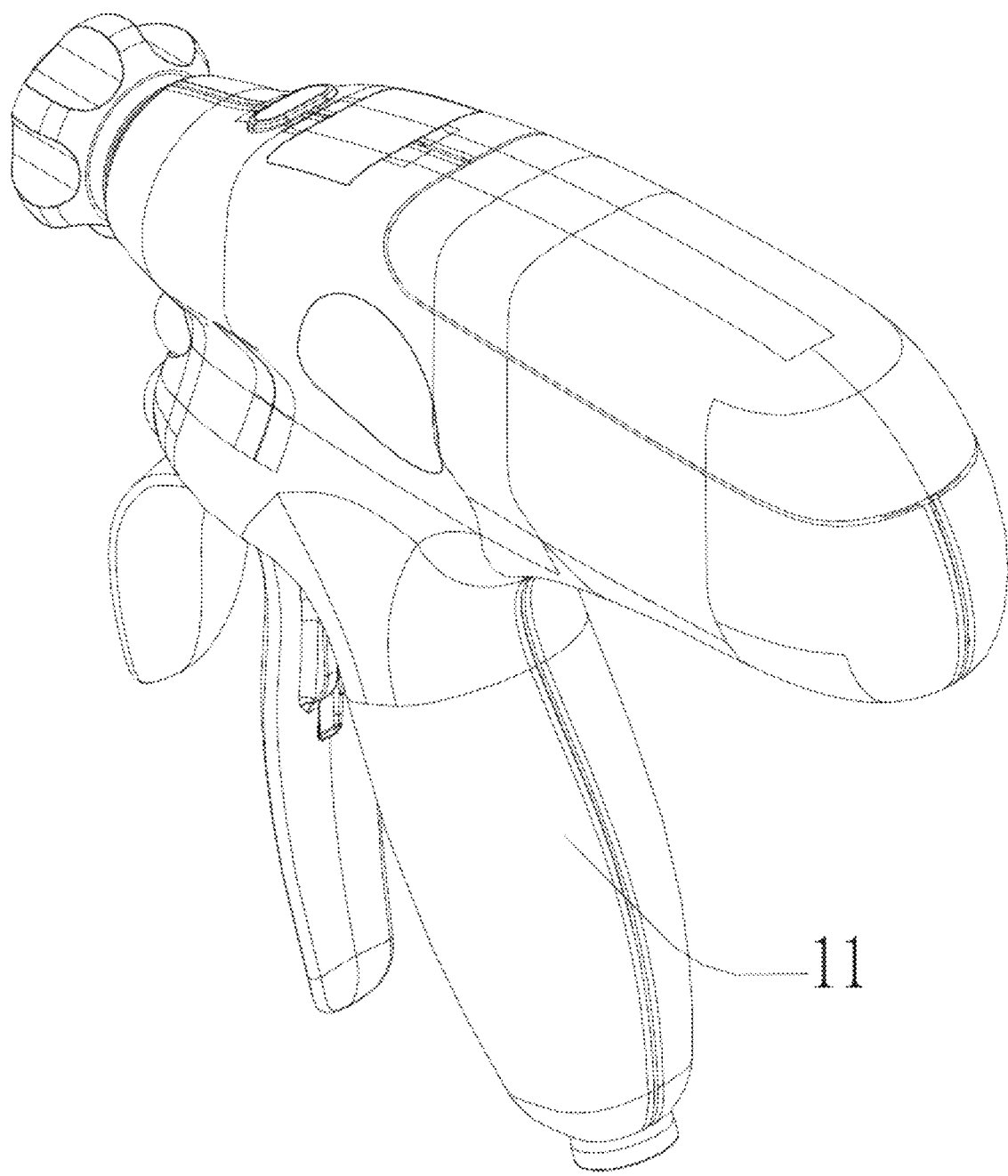
FIG. 11 is a schematic overall structure diagram of an ultrasonic scalpel handle provided in another exemplary embodiment of the present disclose.

Here, as shown in FIG. 6 and FIG. 7, the transducer housing 121 comprises a front housing 1211, a middle housing 1213 and a rear housing 1212 successively arranged in a front-rear direction, a rubber gasket 125 and a rubber ring 126 are provided between the front housing 1211 and the middle housing 1213 to realize sealing, a rubber ring 126 is provided between the middle housing 1213 and the rear housing 1212 to realize sealing, and meanwhile, the ultrasonic generator 122 contained in the transducer housing 121 is sealed in the transducer housing 121. The conductive element 123 is fixedly mounted on the middle housing 1213 and is located at the front portion of the rear housing 1212.

The conductive element 123 further comprises an insulation sleeve 1234, the insulation sleeve 1234 is fixedly sleeved on an outer peripheral portion of the middle housing 1213, the first conductive ring 1231, the spacer ring 1233 and the second conductive ring 1232 are together sleeved on an outer peripheral portion of a rear segment of the insulation sleeve 1234, and the front portion of the first conductive ring 1231 and the insulation sleeve 1234, the rear portion of the first conductive ring 1231 and the front portion of the spacer ring 1233, the rear portion of the spacer ring 1233 and the front portion of the second conductive ring 1232, and the rear portion of the second conductive ring 1232 and the front portion of the rear housing 1212 are all positioned in cooperation with each other by means of positioning lug bosses 1235 and recesses, in this way, the conductive element 123 is fixed on the transducer housing 121.

Figure 3:
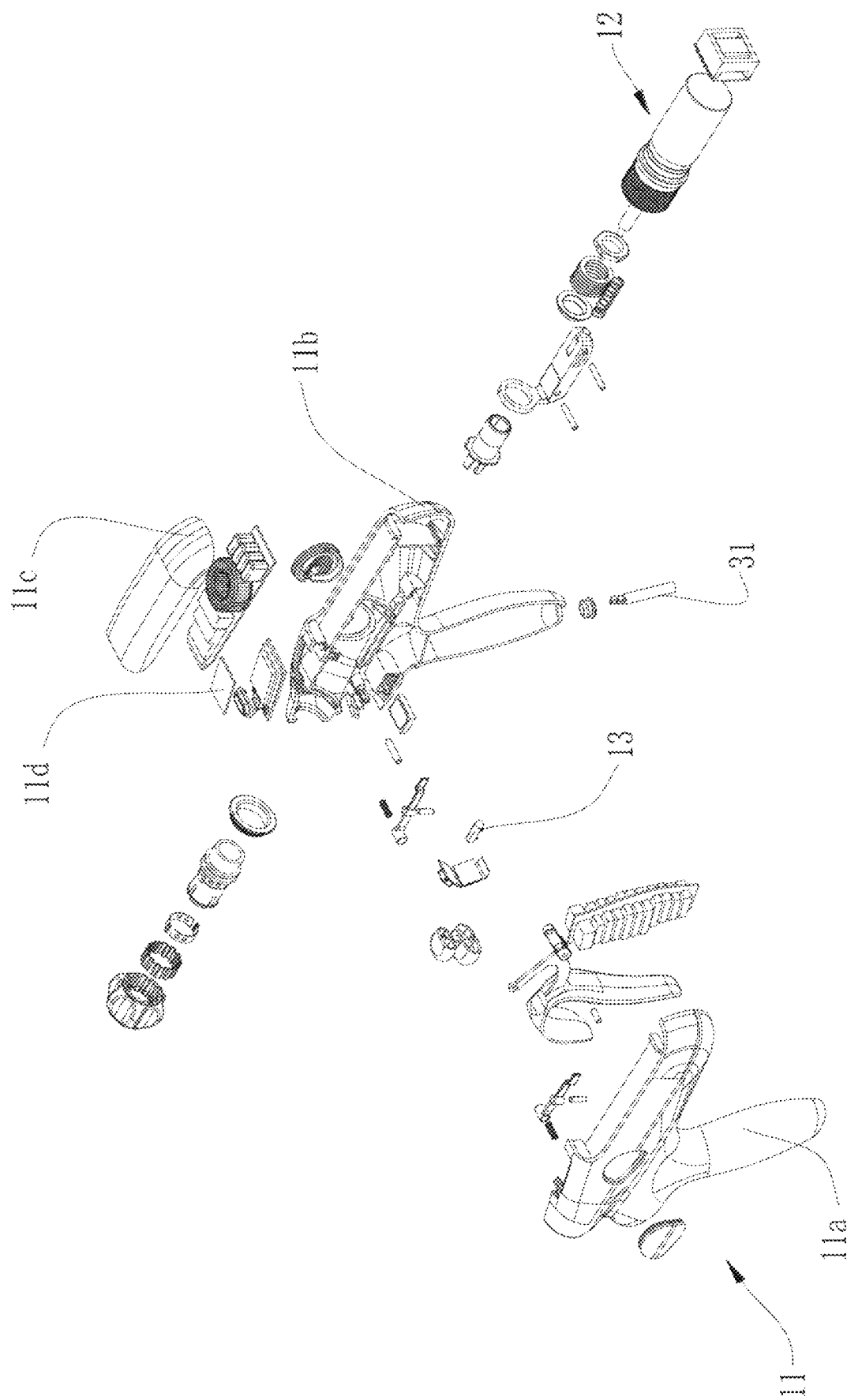
FIG. 3 is a schematic exploded structure diagram of an ultrasonic scalpel handle provided in an exemplary embodiment of the present disclose.
Figure 5:
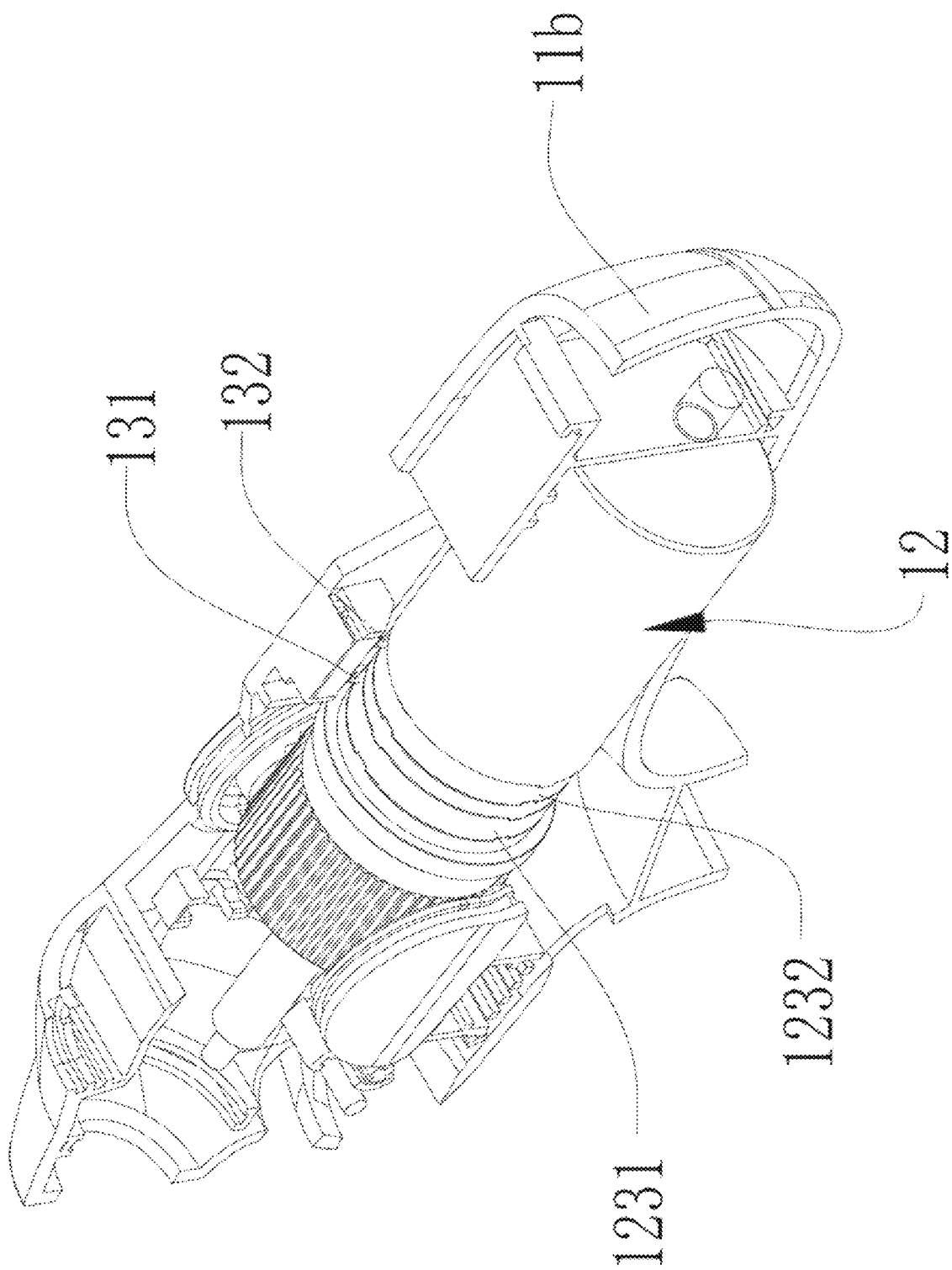
FIG. 5 is a schematic diagram of the connection between a transducer assembly and an electrically connected element in an ultrasonic scalpel handle provided in an exemplary embodiment of the present disclose.

As shown in FIG. 3 and FIG. 5, the handle shell 11 is provided with an electrically connected element 13, the electrically connected element 13 is located on the circumferential outer side of the transducer assembly 12, the electrically connected element 13 is against the outer peripheral portion of the transducer assembly 12 and abuts against the conductive portion, specifically, the electrically connected element 13 comprises a first electrically connected element 131 and a second electrically connected element 132 that are independent of each other, the first electrically connected element 131 and the second electrically connected element 132 are both made of metal material and both have a certain degree of elasticity along their own length direction, and are spaced along the front-rear direction of the handle shell 11, the first electrically connected element 131 elastically abuts against the outer peripheral portion of the first conductive ring 1231 radially inwards along the transducer housing 121, and the second electrically connected element 132 elastically abuts against the outer peripheral portion of the second conductive ring 1232 radially inwards along the transducer housing 121. During the rotation process of the transducer assembly 12 in its entirety around its own axis with respect to the handle shell 11, the first electrically connected element 131 and the first conductive ring 1231, and the second electrically connected element 132 and the second conductive ring 1232 are in contact with each other all the time to maintain electric connection.

Referring to FIG. 5, in this embodiment, the electrically connected element 13 is arranged in the handle shell 11 and located at an upper position, and is located above the transducer assembly 12, such that the electrically connected element 13 can abut against the outer peripheral portion of the transducer assembly 12 downward to maintain electric connection more stably.

In this way, it only needs to connect the power cord to the electrically connected element 13 inside the handle shell 11, then the power cord can be led from the lower portion of the handle shell 11 to connect to the power supply, in this way, during the rotation process of the transducer assembly 12 about its own axis in the handle shell 11, the power cord does not rotate along with it, such that a series of problems of the large arm force and easy fatigue, and knotting of the power cord, etc. caused by the power cord extending from the rear portion of the handle shell 11 are avoided.

In another structure embodiment of an ultrasonic scalpel of the present disclosure, as shown in FIG. 11 to FIG. 19, in this embodiment, the conductive element 123 is fixedly arranged at a rear end portion of the transducer housing 121, the transducer housing 121 can be provided open at its rear portion, and the conductive element 123 seals the transducer housing 121 from the rear end. The conductive portions are arranged at the rear portion of the conductive element 123, the electrically connected element 13 is arranged in the handle shell 11 and located behind the transducer assembly 12, and the electrically connected element 13 elastically abuts against the conductive portions forward.

Specifically, the conductive portion comprises a first conductive portion and a second conductive portion insulated from each other, the ultrasonic generator 122 has two electrically connected wires—a first electrically connected wire and a second electrically connected wire (not shown), the first electrically connected wire is electrically connected to the first conductive portion, and the second electrically connected wire is electrically connected to the second conductive portion. The electrically connected element 13 also comprises a first elastic electrically connected piece 13a and a second elastic electrically connected piece 13b disposed independently and insulated from each other, the first elastic electrically connected piece 13a abuts against the first conductive portion, and the second elastic electrically connected piece 13b abuts against the second conductive portion. The first conductive portion and the second conductive portion mentioned above are in the shape of a disc or a ring taking the axis line of the transducer assembly 12 as a rotation center, in this way, in the process that the transducer assembly 12 rotates about its own axis, the first elastic electrically connected piece 13a and the second elastic electrically connected piece 13b can keep to abut against the first conductive portion and the second conductive portion respectively.

In this embodiment, the conductive element 123 comprises a plate body 123O, and a first conductive piece 123a and a second conductive piece 123b which are fixed on the plate body 123O and made of metal materials, wherein, the first conductive piece 123a is in the shape of a disc, and the second conductive piece 123b is in the shape of a ring and circumferentially disposed on the circumferential outer side of the first conductive piece 123a, and the first conductive piece 123a and the second conductive piece 123b are spaced in the radial direction of the conductive element 123, that is, the outer circumferential wall of the first conductive piece 123a and the inner circumferential wall of the second conductive piece 123b have a distance in the radial direction of the conductive element 123. The first conductive piece 123a forms the first conductive portion, and the second conductive piece 123b forms the second conductive portion.

A first perforated hole 123c and a second perforated hole 123d are opened on the plate body 123O penetrating in its own thickness direction, the first electrically connected wire runs through the first perforated hole 123c and fixedly to the first conductive piece 123a by means of welding to realize electric connection, and the second electrically connected wire runs through the second perforated hole 123d and fixedly to the second conductive piece 123b by means of welding to realize electric connection.

Figure 12:
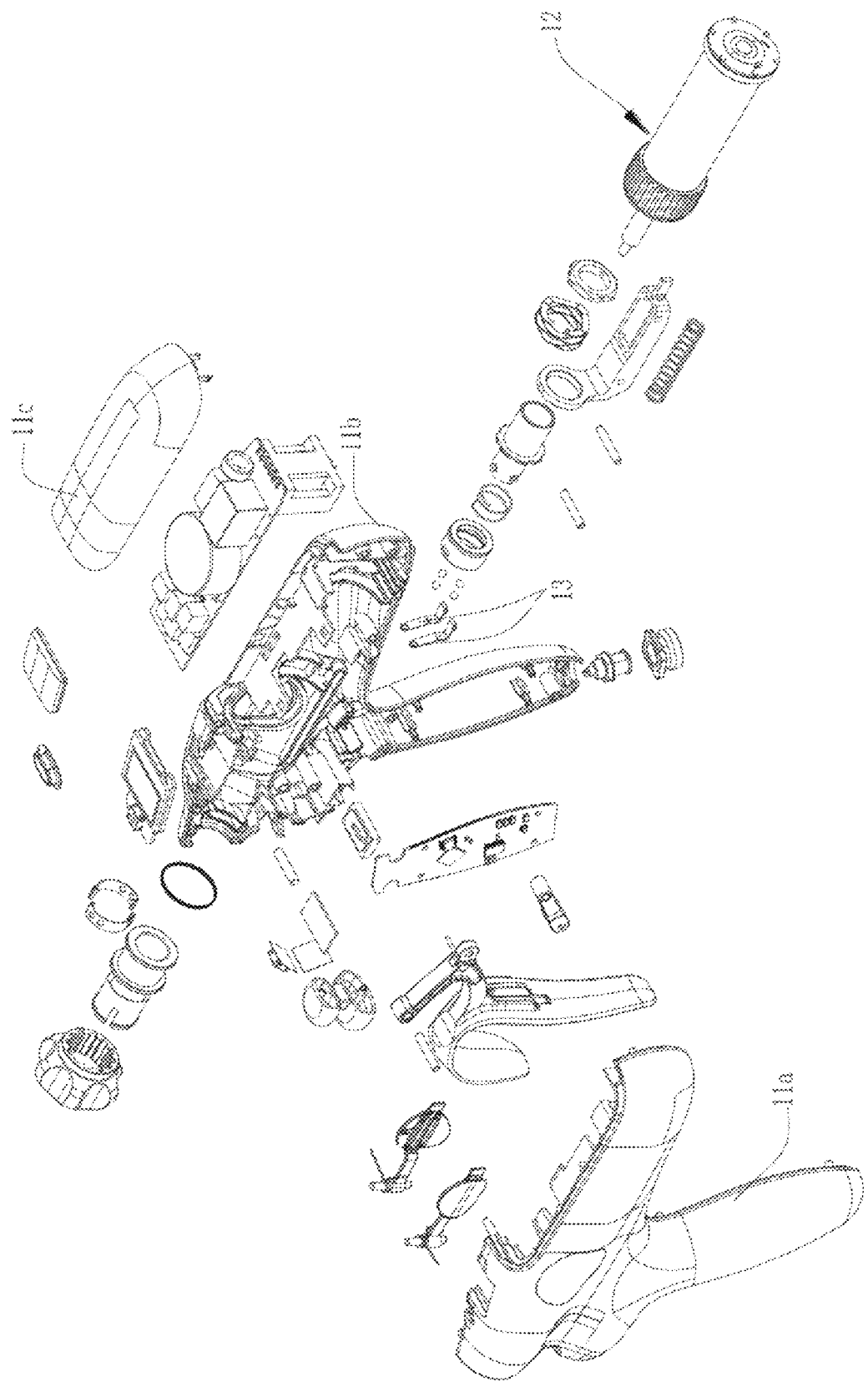
FIG. 12 is a schematic exploded structure diagram of an ultrasonic scalpel handle provided in another exemplary embodiment of the present disclose.
Figure 13:
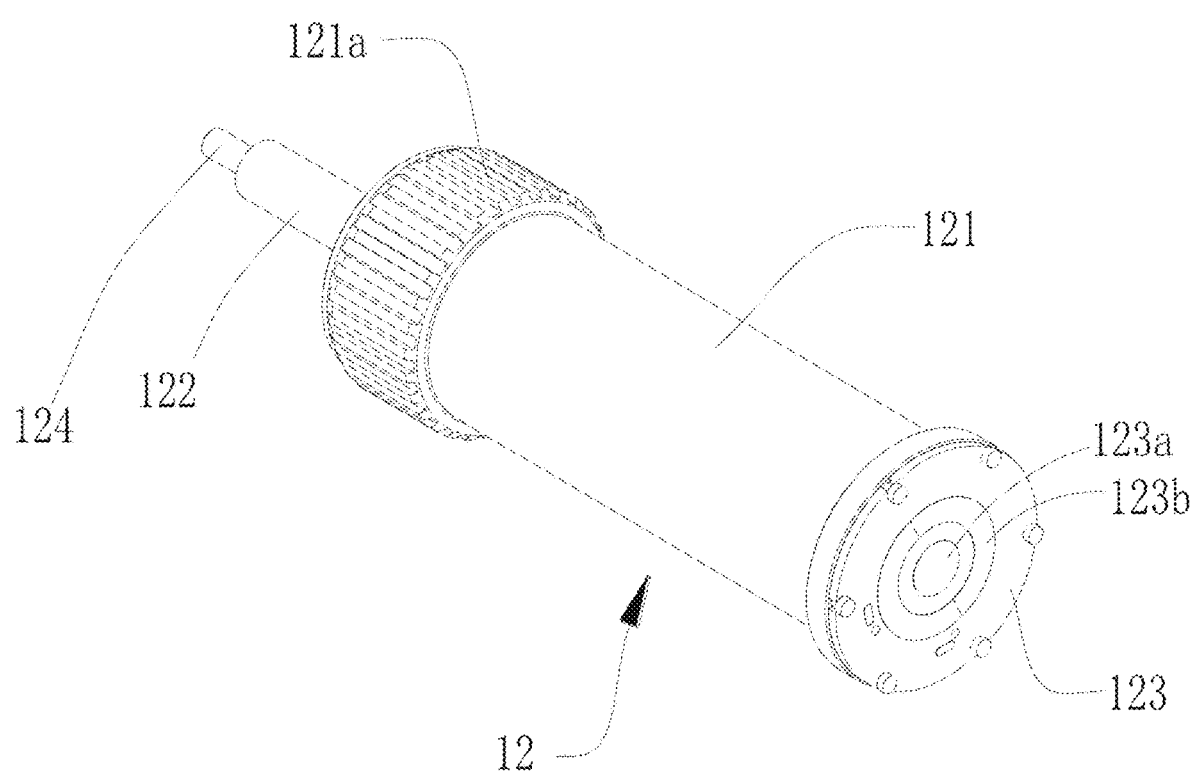
FIG. 13 is a schematic overall structure diagram of a transducer assembly provided in another exemplary embodiment of the present disclose.
Figure 14:
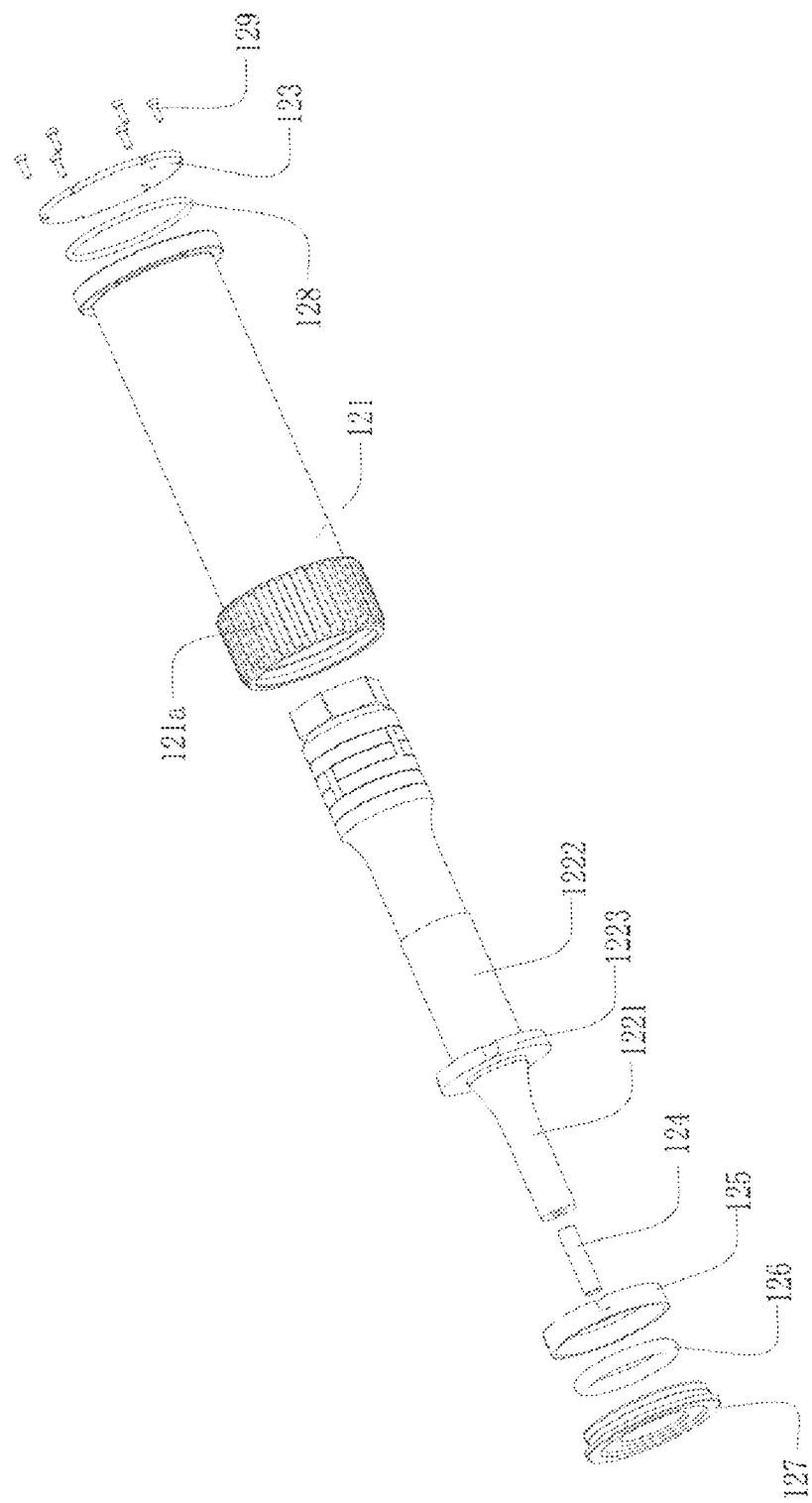
FIG. 14 is a schematic exploded structure diagram of the transducer assembly of FIG. 13.
Figure 15:
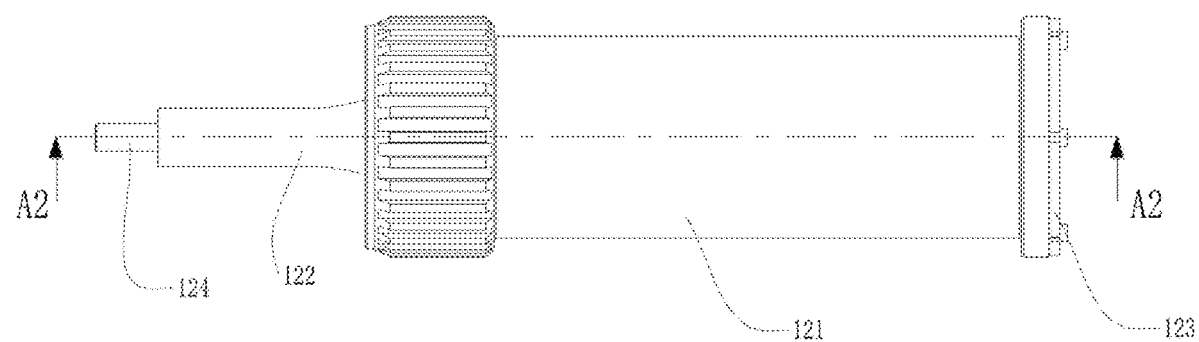
FIG. 15 is a front view of the transducer assembly of FIG. 13.
Figure 16:
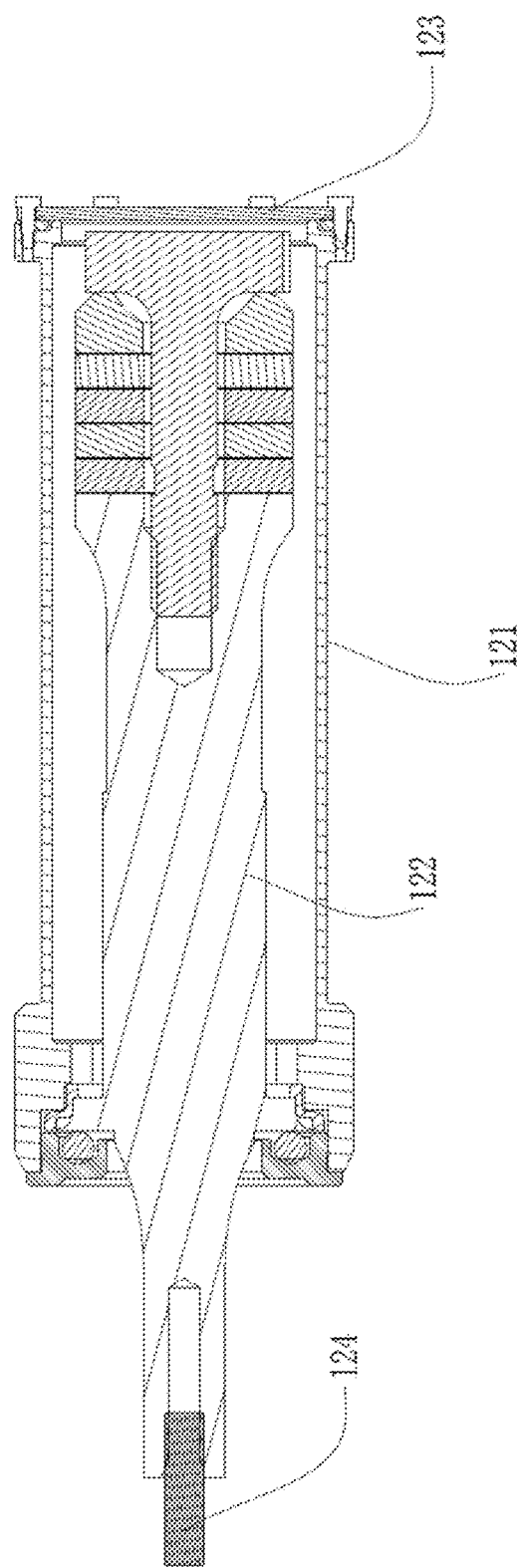
FIG. 16 is a schematic sectional view along Direction A2-A2 in FIG. 15.
Figure 17:
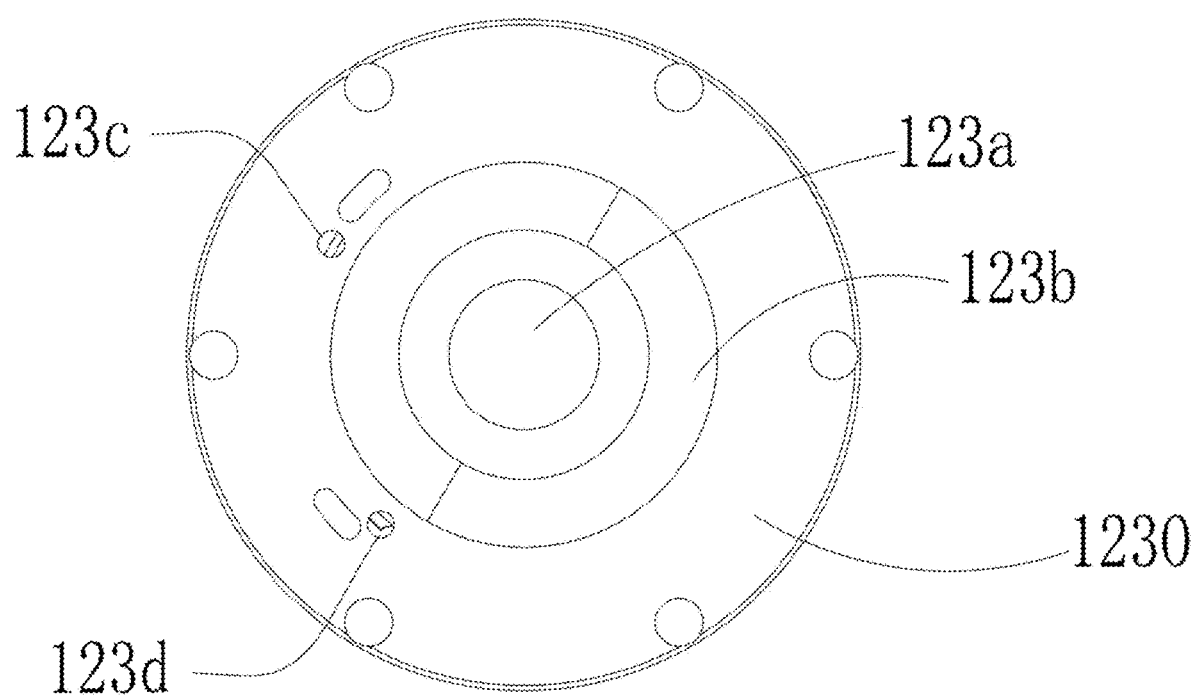
FIG. 17 is a left view of the transducer assembly of FIG. 13.
Figure 18:
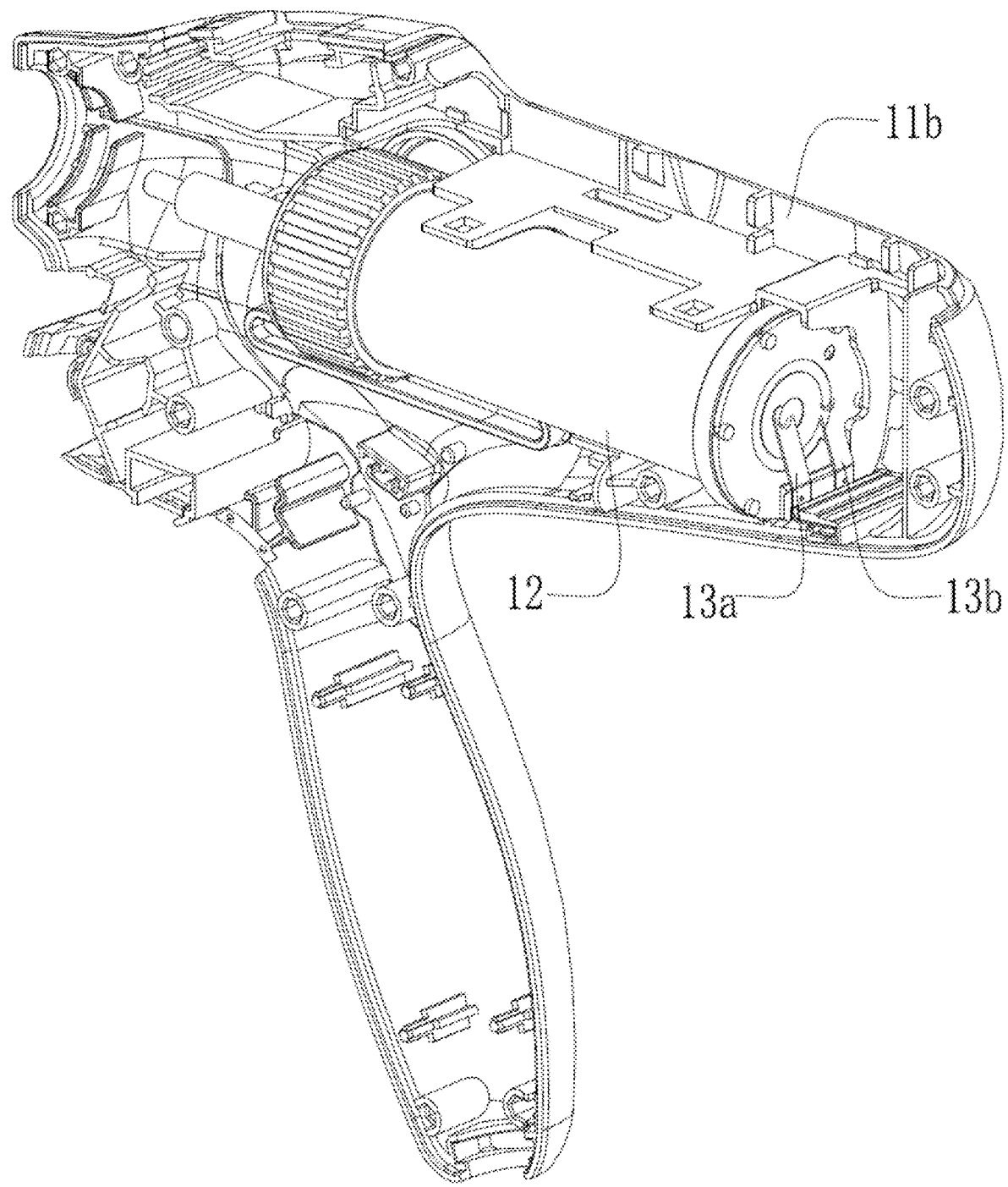
FIG. 18 is a schematic structure diagram of the connection between a transducer assembly and an electrically connected element provided in another exemplary embodiment of the present disclose.

Referring to FIG. 12 and FIG. 18, the first elastic electrically connected piece 13a and the second elastic electrically connected piece 13b are both elastic pieces made of metal materials, the lower end portion of the first elastic electrically connected piece 13a and the lower end portion of the second elastic electrically connected piece 13b are fixedly disposed in the handle shell 11 respectively, the upper end portion of the first elastic electrically connected piece 13a presses against the rear side of the first conductive piece 123a forward, and the upper end portion of the second elastic electrically connected piece 13b presses against the rear side of the second conductive piece 123b forward.

In this way, it only needs to connect the two conductive wires of the power cord to the first elastic electrically connected piece 13a and the second elastic electrically connected piece 13b respectively, then the power cord can be led from the lower portion of the handle shell 11 to connect to the power supply, in this way, in the rotation process of the transducer assembly 12 about its own axis in the handle shell 11, the power cord does not rotate along with it, such that a series of problems of the large arm force and easy fatigue, and knotting of the power cord, etc. caused by the power cord extending from the rear portion of the handle shell 11 are avoided.

Figure 20:
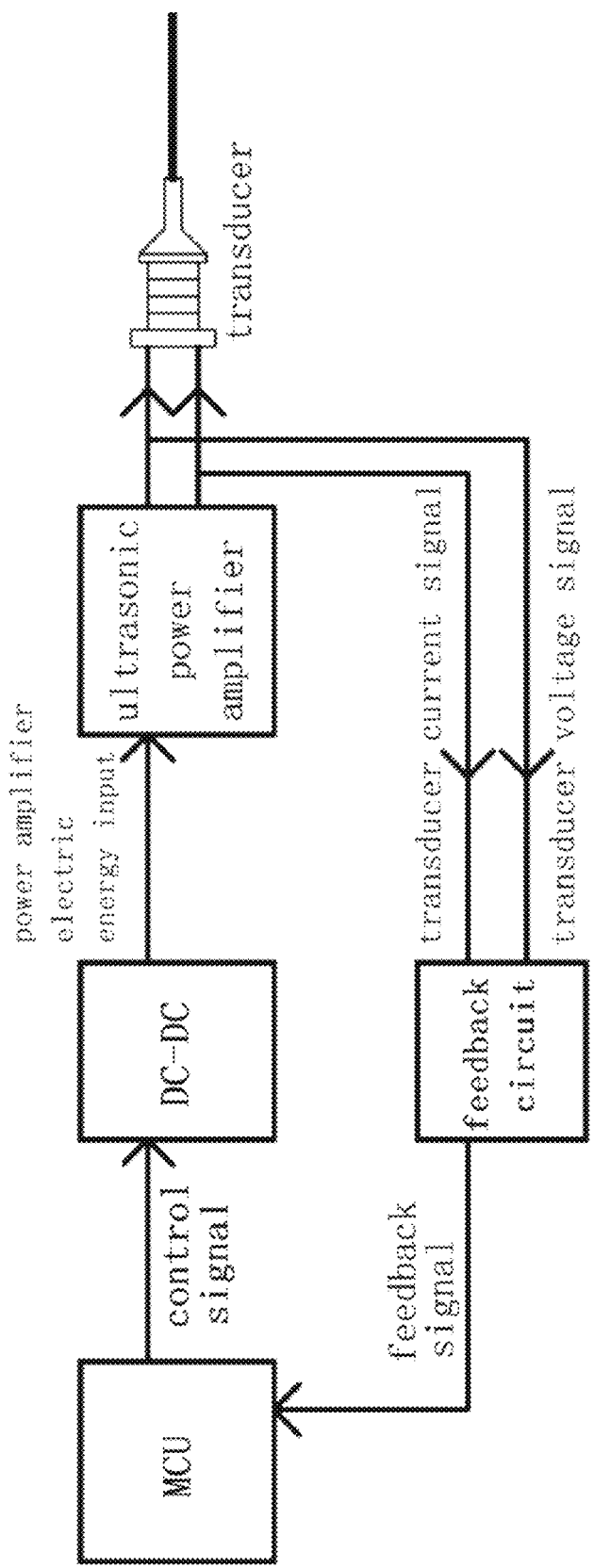
FIG. 20 is a schematic circuit diagram of an energy instrument for surgery provided in an exemplary embodiment of the present disclose.
Figure 22:
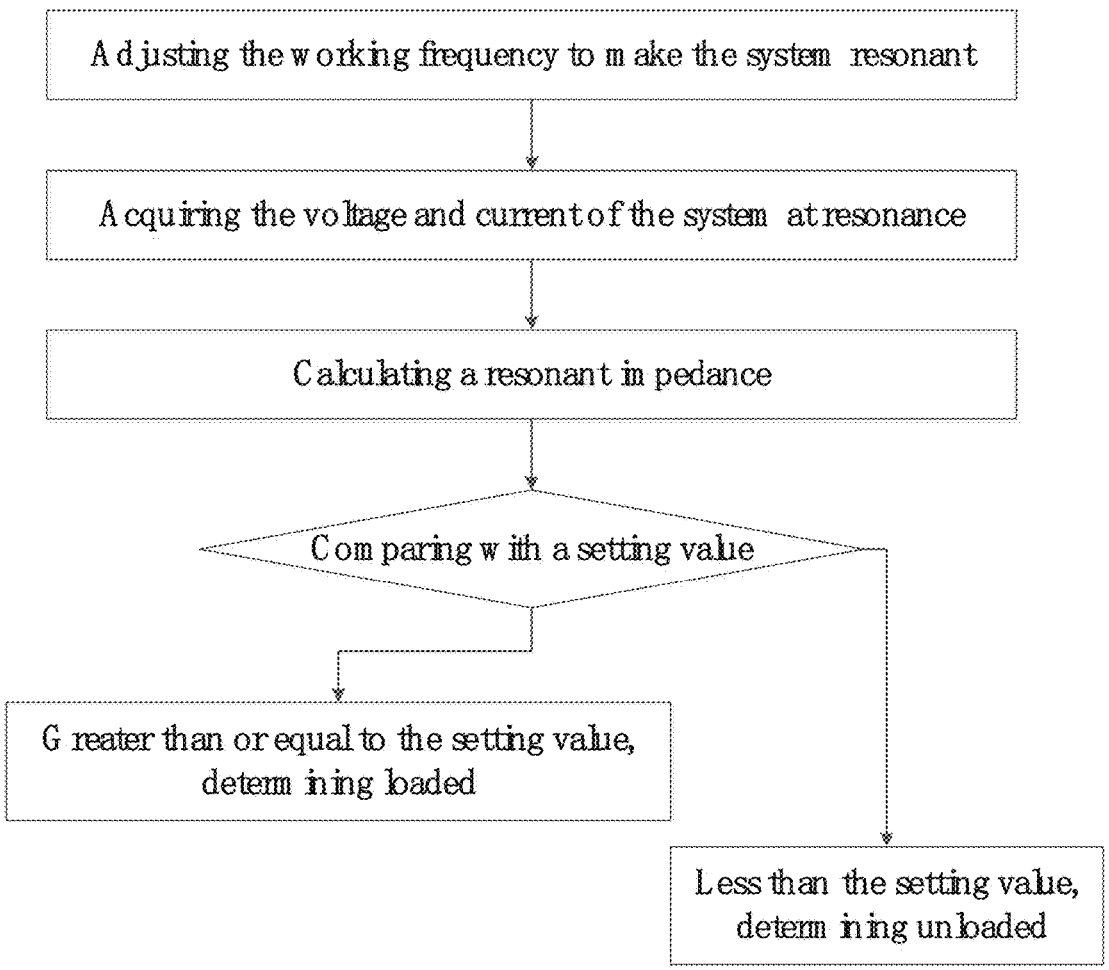
FIG. 22 is a schematic flow chart of the instrument load condition discrimination provided in an exemplary embodiment of the present disclose.

The scheme for detecting the load conditions of the ultrasonic scalpel using the load detection module is explained below in detail:

Way I, Determine whether the ultrasonic scalpel is loaded according to the resonant impedance: the load detection module comprises a resonance signal acquisition unit, an impedance calculation unit, and a determination unit, the resonance signal acquisition unit is referred to a current and voltage sampling and processing unit as shown in FIG. 20, on the premise of the inherent function of the circuit of the ultrasonic scalpel of automatically adjusting the working frequency to make the system resonant, the current and voltage sampling and processing unit is configured to sample the voltage and current output by the ultrasonic generator; based on this, the impedance calculation unit calculates the resonant impedance; the determination unit then determines the load condition of the ultrasonic scalpel based on the resonant impedance calculation result, as shown in FIG. 22: comparing the calculation result with a preset impedance threshold, if the calculated resonant impedance is greater than or equal to the preset impedance threshold, it is determined that the load condition of the ultrasonic scalpel is loaded; if the calculated resonant impedance is less than the preset impedance threshold, it is determined that the load condition of the ultrasonic scalpel is unloaded.

It should be noted that in this embodiment, each unit of the load detection module is only divided by function, without limiting its specific hardware construction, for example, the impedance calculation unit may be divided into the current and voltage sampling and processing unit in FIG. 20, or may be divided into a control module (MCU or FPGA digital control center); the determination unit may also be divided into different types.

Way II, Determine whether the ultrasonic scalpel is loaded according to the change of the resonant frequency: the load detection module comprises a resonance signal acquisition unit and a determination unit, the resonance signal acquisition unit is configured to sample the resonant frequency of the circuit of the ultrasonic scalpel in the resonant state, specifically, as shown in FIG. 20, on the premise of the inherent function of the circuit of the ultrasonic scalpel of automatically adjusting the working frequency to make the system resonant, the current and voltage sampling and processing unit is configured to sample the voltage and current output by the ultrasonic generator, and send the sampled voltage and current results to the control module (MCU or FPGA digital control center), to perform data processing to obtain a corresponding resonant frequency as the sampling result;

the determination unit is configured to determine the load condition of the ultrasonic scalpel based on two consecutive signal acquisition results of the resonance signal acquisition unit, including: comparing the difference between the two consecutive sampled resonant frequencies with a preset frequency change threshold, if the two consecutive sampled resonant frequencies show an upward trend and the absolute value of the difference is greater than or equal to the preset frequency change threshold, it is determined that the load condition of the ultrasonic scalpel transitions from loaded to unloaded; if the two consecutive sampled resonant frequencies show a downward trend and the absolute value of the difference is greater than or equal to the preset frequency change threshold, it is determined that the load condition of the ultrasonic scalpel transitions from unloaded to loaded.

Way III, the energy instrument for surgery further comprises a cutting tool arranged at the front side of the handheld component, the load detection module comprises a biosensor arranged on one end of the cutting tool away from the handheld component, and if the biosensor detects contact with an object or proximity to an object within a preset distance threshold, it outputs a detection result of the energy instrument for surgery being loaded, if not, it outputs a detection result of the energy instrument for surgery being unloaded.

When the ultrasonic scalpel is connected to a power supply, for any one of the above ways, the load detection module detects the load condition of the ultrasonic scalpel at a preset frequency or delay interval (millisecond or microsecond level, such as 100 µs-10 ms). When the ultrasonic scalpel is detected to be unloaded, the output power of the ultrasonic generator is adjusted to the output power corresponding to the first working state, that is, in a standby state; once it is detected that the ultrasonic scalpel has changed from an unloaded state to a loaded state, the output power of the ultrasonic generator quickly returns to the normal level, which is the minimum in the power range of the second working state, and the output power of the ultrasonic generator is tuned and increased with the increase of the load. In a preferred embodiment, when it is detected that the ultrasonic scalpel has transitioned from an unloaded state to a loaded state, if the doctor does not perform output power adjustment during the unloaded state, the output power of the ultrasonic generator quickly recovers to the previous power level, and if the doctor performs output power adjustment during the unloaded state, the output power of the ultrasonic generator is quickly increased to the newly set power level.

For Ways I and II, due to the need of sampling resonant signals (voltage and/or current), the output power of the ultrasonic generator corresponding to the first working state cannot be zero.

The power conversion module is explained below in detail:

In this embodiment, the power conversion module is a DC/DC conversion unit, as shown in FIG. 20, it is electrically connected to an ultrasonic power amplifier module, the DC/DC conversion unit outputs different magnitudes of voltage under the control of the control module;

if the voltage output by the DC/DC conversion unit is lower than a preset first voltage threshold, the ultrasonic power amplifier module drives the ultrasonic generator to output power in the first working state;

if the voltage output by the DC/DC conversion unit is higher than a preset second voltage threshold, the ultrasonic power amplifier module drives the ultrasonic generator to output power in the second working state, wherein, the second voltage threshold is greater than or equal to the first voltage threshold.

Wherein, the ultrasonic power amplifier module is connected to the ultrasonic generator through the conductive element, specifically, the conductive element may be a conductive elastic sheet and a sliding ring; the cutter bar of the cutting tool is fixedly connected to the ultrasonic generator, the ultrasonic generator is configured to perform energy conversion on the electric energy and transfer the converted energy to the cutting tool.

In one embodiment of the present disclosure, an energy instrument for surgery is provided, which comprises:
an energy generating apparatus configured to generate energy;
a handheld component, which is provided with an activation button;
a load detection module, which is configured to detect a load condition of the energy instrument for surgery, the load condition being an unloaded condition or a loaded condition;
a control module, an input end thereof being electrically connected to the activation button and the load detection module; the control module being configured to receive a detection signal from the load detection module and a trigger signal from the activation button, and when the activation button is pressed, the control module outputting a control signal;
a power conversion module, which is electrically connected to an output end of the control module, and is configured to adjust the working state of the energy generating apparatus under the control signal of the control module;
the working states of the energy generating apparatus comprise at least a first working state and a second working state, wherein the magnitude of the output power of the energy generating apparatus in the first working state is less than that in the second working state; if the activation button is pressed and the load detection module detects that the energy instrument for surgery is unloaded, the control module controls the power conversion module to adjust the working state of the energy generating apparatus to the first working state; if the activation button is pressed and the load detection module detects that the energy instrument for surgery is loaded, the control module controls the power conversion module to adjust the working state of the energy generating apparatus to the second working state; if the activation button is not pressed, the output power of the energy generating apparatus is zero.

The energy instrument for surgery provided in this embodiment and the ultrasonic scalpel provided in the above embodiment belong to the same inventive concept, which provides no-load protection for the energy instrument for surgery/ultrasonic scalpel; the load detection module and power conversion module of the energy instrument for surgery in this embodiment are consistent with the load detection module and power conversion module of the ultrasonic scalpel in the above embodiment, which are incorporated into this embodiment by reference, without further elaboration. Optionally, the energy instrument for surgery in this embodiment may be an ultrasonic scalpel, the energy generating apparatus is an ultrasonic generator, and the ultrasonic generator is arranged inside or outside the handheld component;

the energy instrument for surgery may be a laser knife, the energy generating apparatus is a laser generator, and the laser generator is arranged inside or outside the handheld component;

the energy instrument for surgery may be an electric knife, the energy generating apparatus is an electrical signal generator, and the electrical signal generator is arranged inside or outside the handheld component.

In one embodiment of the present disclosure, a power adjustment method for an energy instrument for surgery is provided, wherein the adjusted energy instrument for surgery comprises an activation button and an energy generating apparatus, the control mode of the activation button for energy output is configured as: if the activation button is pressed, the energy generating apparatus outputs energy, if the activation button is released, the energy generating apparatus stops outputting energy, and when the activation button is pressed, the output power of the energy generating apparatus is adjusted according to the load condition of the instrument, the power adjustment method comprises:

if the activation button is pressed, and the load condition of the instrument is unloaded, adjusting the output power of the energy generating apparatus to an output power corresponding to a first working state; if the activation button is pressed, and the load condition of the instrument is loaded, adjusting the output power of the energy generating apparatus to an output power corresponding to a second working state, wherein the magnitude of the output power of the energy generating apparatus in the first working state is less than that in the second working state. The above power adjustment method is applied to the following energy instruments for surgery:

(1) the energy instrument for surgery is an ultrasonic scalpel, the energy generating apparatus is an ultrasonic generator, and the ultrasonic generator is arranged inside or outside the handheld component;

(2) the energy instrument for surgery is a laser knife, the energy generating apparatus is a laser generator, and the laser generator is arranged inside or outside the handheld component;

(3) the energy instrument for surgery is an electric knife, the energy generating apparatus is an electrical signal generator, and the electrical signal generator is arranged inside or outside the handheld component.

It should be noted that herein, relational terms such as first and second are only used to distinguish one entity or operation from another entity or operation, and do not necessarily require or imply any actual relationship or order between these entities or operations. Moreover, terms "comprising", "including", or any other variation thereof are intended to encompass non-exclusive inclusion, such that a process, method, item, or device that includes a series of elements not only includes those elements, but also includes other elements that are not explicitly listed, or also include elements inherent in such a process, method, item, or device. Without further limitations, elements limited by the statement "comprising a . . . " do not exclude the existence of other identical elements in the process, method, item, or device that includes the elements.

The above are only specific implementations of the present application. It should be noted that, for those ordinary skilled/of ordinary skill in the art, any improvements or modifications can be made without depart from the technical principle and conception of the present application, and shall be covered by the protective scope of the present application.

What is claimed is:

1. An ultrasonic scalpel comprising
a handheld component,
a control module,
an ultrasonic generator and an ultrasonic cutter head, wherein the handheld component being provided with an activation button,
a load detection module, which is configured to detect a load condition of the ultrasonic cutter head, the load detection module being electrically connected to an input end of the control module; the load detection module comprises a resonance signal acquisition unit, and a determination unit, wherein, the resonance signal acquisition unit is configured to sample a resonant frequency of a circuit of the ultrasonic scalpel in a resonant state; the determination unit is configured to determine the load condition of the ultrasonic scalpel based on two consecutive signal acquisition results of the resonance signal acquisition unit, including: comparing a difference between the two consecutive signal acquisition results with a preset frequency change threshold, when the two consecutive sampled resonant frequencies show an upward trend and an absolute value of the difference is greater than or equal to the preset frequency change threshold, it is determined that the load condition of the ultrasonic scalpel transitions from loaded to unloaded; when the two consecutive sampled resonant frequencies show a downward trend and the absolute value of the difference is greater than or equal to the preset frequency change threshold, it is determined that the load condition of the ultrasonic scalpel transitions from unloaded to loaded;
a power conversion module, an input side thereof being electrically connected to an output end of the control module, and an output side thereof being electrically connected to the ultrasonic generator; and the control module is configured to receive a detection signal from the load detection module, and when the activation button is pressed, the control module controls the power conversion module to adjust an output power of the ultrasonic generator according to the detection signal.

2. The ultrasonic scalpel according to claim 1, wherein the ultrasonic generator comprises at least a first working state and a second working state, wherein a magnitude of the output power of the ultrasonic generator in the first working state is less than that in the second working state; when the activation button is pressed and the ultrasonic cutter head is unloaded, the control module controls the power conversion module to adjust the ultrasonic generator to operate in the first working state; when the activation button is pressed and the ultrasonic cutter head is loaded, the control module controls the power conversion module to adjust the ultrasonic generator to operate in the second working state.

3. The ultrasonic scalpel according to claim 2, wherein the output power of the ultrasonic generator in the first working state ranges from 0.01 to 3 W; the output power of the ultrasonic generator in the second working state ranges from 3 to 45 W.

4. The ultrasonic scalpel according to claim 2, wherein the power conversion module is a DC/DC conversion unit electrically connected to an ultrasonic power amplifier module, and the DC/DC conversion unit outputs different magnitudes of voltage controlled by the control module;
  wherein when the voltage output by the DC/DC conversion unit is lower than a preset first voltage threshold, the ultrasonic power amplifier module drives the ultrasonic generator to output power in the first working state; and
  wherein when the voltage output by the DC/DC conversion unit is higher than a preset second voltage threshold, the ultrasonic power amplifier module drives the ultrasonic generator to output power in the second working state, wherein, the preset second voltage threshold is greater than or equal to the preset first voltage threshold.

5. The ultrasonic scalpel according to claim 4, wherein the handheld component comprises a handle shell, a transducer assembly and a power cord, wherein the control module and the transducer assembly are arranged within a receiving cavity of the handle shell, and the transducer assembly is rotatably arranged around an axis in the receiving cavity; and
  wherein one end portion of the power cord is connected to the transducer assembly in the receiving cavity, and the other end portion of the power cord goes through a lower portion of the handle shell to the outside of the receiving cavity.

6. The ultrasonic scalpel according to claim 5, wherein the transducer assembly comprises a transducer housing, the transducer housing and the ultrasonic generator are fixedly arranged to each other, the transducer housing has a hollow cavity, at least a rear portion of the ultrasonic generator is housed within the hollow cavity, and the transducer assembly further comprises a conductive element fixedly arranged on an outer side of the transducer housing; and
  wherein the conductive element has at least a conductive portion, the ultrasonic generator is fixedly and electrically connected to the conductive portion, the receiving cavity of the handle shell is further fixedly provided with an electrically connected element therein, the electrically connected element abuts against the conductive portion, and when the transducer assembly is rotated about its own axis with respect to the handle shell, the electrically connected element is always in contact with the conductive portion to maintain electric connection.

7. The ultrasonic scalpel according to claim 1, wherein the activation button is electrically connected to the input end of the control module, and when the ultrasonic scalpel is connected to a power supply, the load detection module detects the load condition of the ultrasonic scalpel at a preset frequency or delay interval;
  wherein when the activation button is pressed, and the load detection module detects that the ultrasonic cutter head transitions from a loaded state to an unloaded state, the control module controls the power conversion module to adjust the output power of the ultrasonic generator to decrease, so as to reduce vibration amplitude of a cutting tool of the ultrasonic scalpel;
  wherein when the activation button is pressed, and the load detection module detects that the ultrasonic cutter head transitions from an unloaded state to a loaded state, the control module controls the power conversion module to adjust the output power of the ultrasonic generator to increase; and
  wherein if the activation button is not pressed, the output power of the ultrasonic generator is zero.

8. The ultrasonic scalpel according to claim 1, wherein the load detection module comprises a resonance signal acquisition unit, an impedance calculation unit, and a determination unit,
  wherein the resonance signal acquisition unit is configured to sample voltage and current of a circuit of the ultrasonic scalpel in a resonant state;
  wherein the impedance calculation unit is configured to calculate a resonant impedance based on the voltage and current signals sampled by the resonance signal acquisition unit; and
  wherein the determination unit is configured to determine the load condition of the ultrasonic scalpel based on a calculation result of the impedance calculation unit, including: comparing the calculation result with a preset impedance threshold, if a calculated resonant impedance is greater than or equal to the preset impedance threshold, it is determined that the load condition of the ultrasonic scalpel is loaded; if a calculated resonant impedance is less than the preset impedance threshold, it is determined that the load condition of the ultrasonic scalpel is unloaded.

9. The ultrasonic scalpel according to claim 1, further comprising a cutting tool arranged at a front side of the handheld component; the load detection module further comprises a biosensor arranged on one end of the cutting tool away from the handheld component; when the biosensor detects contact with an object or proximity to an object within a preset distance threshold, it outputs a detection result of the ultrasonic scalpel being loaded, when not, it outputs a detection result of the ultrasonic scalpel being unloaded.

10. An energy instrument for surgery, comprising:
  an energy generating apparatus configured to generate energy;
  a handheld component, which is provided with an activation button;
  a load detection module, which is configured to detect a load condition of the energy instrument for surgery, the load condition being an unloaded condition or a loaded condition; the load detection module comprises a resonance signal acquisition unit, and a determination unit, wherein, the resonance signal acquisition unit is configured to sample a resonant frequency of a circuit of the energy instrument in a resonant state; the determination unit is configured to determine the load condition of the energy instrument based on two consecutive signal acquisition results of the resonance signal acquisition unit, including: comparing a difference between the two consecutive signal acquisition results with a preset frequency change threshold, when the two consecutive sampled resonant frequencies show an upward trend and an absolute value of the difference is greater than or equal to the preset frequency change threshold, it is determined that the load condition of the energy instrument transitions from loaded to unloaded; when the two consecutive sampled resonant frequencies show a downward trend and the absolute value of the difference is greater than or equal to the preset frequency change threshold, it is determined that the load condition of the energy instrument transitions from unloaded to loaded;

a control module, an input end thereof being electrically connected to the load detection module and the activation button; the control module being configured to receive a detection signal from the load detection module, and when the activation button is pressed, the control module outputting a control signal; and a power conversion module, which is electrically connected to an output end of the control module, and is configured to adjust the output power of the energy generating apparatus triggered by the control signal of the control module;

wherein the energy generating apparatus comprises at least a first working state and a second working state, wherein a magnitude of the output power of the energy generating apparatus in the first working state is less than that in the second working state; when the activation button is pressed and the load detection module detects that it is unloaded currently, the control module controls the power conversion module to adjust the energy generating apparatus to operate in the first working state, so as to reduce vibration amplitude of a cutting tool of the energy instrument; when the activation button is pressed and the load detection module detects that it is loaded currently, the control module controls the power conversion module to adjust the energy generating apparatus to operate in the second working state.

11. The energy instrument for surgery according to claim 10, wherein the power conversion module is a DC/DC conversion unit electrically connected to a power amplifier module, and the DC/DC conversion unit outputs different magnitudes of voltage controlled by the control module;

wherein when the voltage output by the DC/DC conversion unit is lower than a preset first voltage threshold, the power amplifier module drives the energy generating apparatus to output power in the first working state; and wherein when the voltage output by the DC/DC conversion unit is higher than a preset second voltage threshold, the power amplifier module drives the energy generating apparatus to output power in the second working state, wherein, the preset second voltage threshold is greater than or equal to the preset first voltage threshold.

12. The energy instrument for surgery according to claim 10, wherein the load detection module comprises a resonance signal acquisition unit, an impedance calculation unit, and a determination unit, wherein, the resonance signal acquisition unit is configured to sample a voltage and current of a circuit of the energy instrument for surgery in a resonant state;

wherein the impedance calculation unit is configured to calculate a resonant impedance based on the voltage and current signals sampled by the resonance signal acquisition unit; and wherein the determination unit is configured to determine the load condition of the energy instrument for surgery based on calculation result of the impedance calculation unit, including:

comparing the calculation result with a preset impedance threshold, when a calculated resonant impedance is greater than or equal to the preset impedance threshold, it is determined that the load condition of the energy instrument for surgery is loaded; when a calculated resonant impedance is less than the preset impedance threshold, it is determined that the load condition of the energy instrument for surgery is unloaded.

13. The energy instrument for surgery according to claim 12, wherein when the circuit of the energy instrument for surgery is switched on, the load detection module detects the load condition of the energy instrument for surgery at a preset frequency or delay interval.

14. The energy instrument for surgery according to claim 10, wherein the energy instrument for surgery is an ultrasonic scalpel, the energy generating apparatus is an ultrasonic generator, and the ultrasonic generator is arranged inside or outside the handheld component;

the energy instrument for surgery is a laser knife, the energy generating apparatus is a laser generator, and the laser generator is arranged inside or outside the handheld component; or the energy instrument for surgery is an electric knife, the energy generating apparatus is an electrical signal generator, and the electrical signal generator is arranged inside or outside the handheld component.

15. The energy instrument for surgery according to claim 10, wherein the energy instrument for surgery further comprises a cutting tool arranged at a front side of the handheld component, the load detection module comprises a biosensor arranged on one end of the cutting tool away from the handheld component, when the biosensor detects contact with an object or proximity to an object within a preset distance threshold, it outputs a detection result of the energy instrument for surgery being loaded, when not, it outputs a detection result of the energy instrument for surgery being unloaded.

16. A power adjustment method for an energy instrument for surgery, the energy instrument for surgery comprising an activation button and an energy generating apparatus, when the activation button is pressed, the energy generating apparatus outputting energy, when the activation button is released, the energy generating apparatus stopping outputting energy, when the activation button is pressed, the output power of the energy generating apparatus is adjusted according to a load condition of the instrument, the power adjustment method comprises:

detecting the load condition of the energy instrument with a load detection module, wherein the load detection module comprises a resonance signal acquisition unit, and a determination unit, wherein, the resonance signal acquisition unit is configured to sample a resonant frequency of a circuit of the energy instrument in a resonant state; the determination unit is configured to determine the load condition of the energy instrument based on two consecutive signal acquisition results of the resonance signal acquisition unit, including: comparing a difference between the two consecutive signal acquisition results with a preset frequency change threshold, when the two consecutive sampled resonant frequencies show an upward trend and an absolute value of the difference is greater than or equal to the preset frequency change threshold, it is determined that the load condition of the energy instrument transitions from loaded to unloaded; when the two consecutive sampled resonant frequencies show a downward trend and the absolute value of the difference is greater than or equal to the preset frequency change threshold, it is determined that the load condition of the energy instrument transitions from unloaded to loaded;

when the activation button is pressed, and the load condition of the instrument is unloaded, adjusting the output power of the energy generating apparatus to an output power corresponding to a first working state, so as to reduce vibration amplitude of a cutting tool of the energy instrument; when the activation button is pressed, and the load condition of the instrument is loaded, adjusting the output power of the energy generating apparatus to an output power corresponding to a second working state, wherein a magnitude of the output power of the energy generating apparatus in the first working state is less than that in the second working state.

17. The power adjustment method according to claim 16, wherein it the method is applied to the following energy instruments for surgery:

the energy instrument for surgery is an ultrasonic scalpel, the energy generating apparatus is an ultrasonic generator, and the ultrasonic generator is arranged inside or outside a handheld component;

the energy instrument for surgery is a laser knife, the energy generating apparatus is a laser generator, and the laser generator is arranged inside or outside the handheld component; or the energy instrument for surgery is an electric knife, the energy generating apparatus is an electrical signal generator, and the electrical signal generator is arranged inside or outside the handheld component.

* * * * *